(12) United States Patent
Serizawa et al.

(10) Patent No.: US 7,069,305 B2
(45) Date of Patent: Jun. 27, 2006

(54) COMPUTER SYSTEM AND A DATA TRANSFER METHOD THEREOF USING REMOTE DIRECT MEMORY ACCESS

(75) Inventors: Kazuyoshi Serizawa, Yokohama (JP); Hirofumi Nagasuka, Sagamihara (JP); Taketoshi Sakuraba, Sagamihara (JP); Kenta Ninose, Yokohama (JP); Masahiro Yamashita, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 733 days.

(21) Appl. No.: 09/740,011

(22) Filed: Dec. 20, 2000

(65) Prior Publication Data

US 2001/0051994 A1 Dec. 13, 2001

(30) Foreign Application Priority Data

Jun. 8, 2000 (JP) .............................. 2000-177123

(51) Int. Cl.
*G06F 15/16* (2006.01)
*G06F 15/167* (2006.01)

(52) U.S. Cl. ................... 709/213; 709/211; 709/218; 709/248

(58) Field of Classification Search ................ 709/211, 709/203; 714/6; 707/100, 204
See application file for complete search history.

(56) References Cited

U.S. PATENT DOCUMENTS

| 5,813,009 A * | 9/1998 | Johnson et al. ............. 707/100 |
| 6,304,980 B1 * | 10/2001 | Beardsley et al. ............. 714/6 |
| 6,542,941 B1 * | 4/2003 | Simpson, III ................. 710/30 |
| 6,549,921 B1 * | 4/2003 | Ofek ........................... 707/204 |
| 6,587,921 B1 * | 7/2003 | Chiu et al. ................... 711/119 |
| 6,694,392 B1 * | 2/2004 | Haren ........................... 710/65 |
| 2002/0168966 A1 * | 11/2002 | Tillier ........................... 455/412 |

FOREIGN PATENT DOCUMENTS

| JP | 6-67944 | 3/1994 |
| JP | 6-149485 | 5/1994 |

OTHER PUBLICATIONS

"Virtual Interface Architecture Specification", Version 1.0, Dec. 16, 1997, Compac, Intel & Microsoft.

* cited by examiner

*Primary Examiner*—Rupal Dharia
*Assistant Examiner*—Quang N. Nguyen
(74) *Attorney, Agent, or Firm*—Mattingly, Stanger, Malur & Brundidge, P.C.

(57) ABSTRACT

In the data transfer method between a couple of computer nodes in the related art, an overhead for the waiting between programs to conduct the data transfer is considerably large.

In the present invention, a first program to transmit data stores the data to the main storage area in the desired time interval. A second program to receive data refers to the above area using RDMA in the desired time interval. Otherwise, the second program to receive data refers to the main storage in the desired time interval. A first program to transmit data stores data to above area using RDMA in the desired time interval. Moreover, in order to detect the passing between the write and read operations, an identifier is provided to each record and the access sequence of the identifier and record is inverted in the read and write operations. Or, an identifier and an error checking code are added to each record.

10 Claims, 28 Drawing Sheets

FIG. 6

DATA RECORD TABLE 151

| | | IDENTIFIER | DATA RECORD | |
|---|---|---|---|---|
| ENTRY: m-1 → | 152.m-1 | n-1 | EMPTY DATA RECORD | 153.m-1 |
| ENTRY: m-2 → | 152.m-2 | m-3 | EMPTY DATA RECORD | 153.m-2 |
| ENTRY: m-3 → | 152.m-3 | m-4 | EMPTY DATA RECORD | 153.m-3 |
| | | ⋮ | ⋮ | |
| ENTRY: 2 → | 152.2 | 1 | EMPTY DATA RECORD | 153.2 |
| ENTRY: 1 → | 152.1 | 0 | EMPTY DATA RECORD | 153.1 |
| ENTRY: 0 → | 152.0 | -1 | EMPTY DATA RECORD | 153.0 |

FIG. 7

DATA RECORD TABLE 251

| | | IDENTIFIER | DATA RECORD | |
|---|---|---|---|---|
| ENTRY: l-1 → | 252.l-1 | n-1 | EMPTY DATA RECORD | 253.l-1 |
| ENTRY: l-2 → | 252.l-2 | l-3 | EMPTY DATA RECORD | 253.l-2 |
| ENTRY: l-3 → | 252.l-3 | l-4 | EMPTY DATA RECORD | 253.l-3 |
| | | ⋮ | ⋮ | |
| ENTRY: 2 → | 252.2 | 1 | EMPTY DATA RECORD | 253.2 |
| ENTRY: 1 → | 252.1 | 0 | EMPTY DATA RECORD | 253.1 |
| ENTRY: 0 → | 252.0 | -1 | EMPTY DATA RECORD | 253.0 |

FIG. 16

DATA RECORD TABLE

| IDENTIFIER | DATA RECORD | ERROR CHECKING CODE |
|---|---|---|
| n-1 | EMPTY DATA RECORD | INCORRECT CODE |
| m-3 | EMPTY DATA RECORD | INCORRECT CODE |
| m-4 | EMPTY DATA RECORD | INCORRECT CODE |
| ⋮ | ⋮ | ⋮ |
| 1 | EMPTY DATA RECORD | INCORRECT CODE |
| 0 | EMPTY DATA RECORD | INCORRECT CODE |
| -1 | EMPTY DATA RECORD | INCORRECT CODE |

ENTRY: m-1 → 152.m-1, 154.m-1
ENTRY: m-2 → 152.m-2, 154.m-2
ENTRY: m-3 → 152.m-3, 154.m-3
ENTRY: 2 → 152.2, 154.2
ENTRY: 1 → 152.1, 154.1
ENTRY: 0 → 152.0, 154.0

DATA RECORD TABLE

| IDENTIFIER | DATA RECORD | ERROR CHECKING CODE |
|---|---|---|
| ⋮ | ⋮ | ⋮ |
| 12 | DATA RECORD DURING REWRITING | INCORRECT CODE |
| 68 | THE 68TH DATA RECORD | CORRECT CODE |
| 67 | THE 67TH DATA RECORD | CORRECT CODE |
| 66 | THE 66TH DATA RECORD | CORRECT CODE |
| ⋮ | ⋮ | ⋮ |

ENTRY: 12 → 152.12, 154.12
ENTRY: 11 → 152.11, 154.11
ENTRY: 10 → 152.10, 154.10
ENTRY: 9 → 152.9, 154.9

151

COMPUTER SYSTEM AND A DATA TRANSFER METHOD THEREOF USING REMOTE DIRECT MEMORY ACCESS

BACKGROUND OF THE INVENTION

1. Field of the Invention

The present invention relates to the process to transfer the data consisting of a plurality of records among the computers connected with a network or an input/output channel

2. Description of the Related Art

Following two kinds of technologies have been proposed as the prior arts for transferring the data consisting of many records between a couple of computer nodes.

The first related art is described from the line 61 to the line 81 on the page 2 of the Japanese Laid-Open Publication No. H6-67944. This first related art discloses a method of using a common disc drive for a couple of computer nodes. In this method, a set consisting of two volumes storing the same data is prepared and each volume is respectively connected to each computer node for the purpose of common use. When one computer node desires to refer to the data, it releases the set of volumes (separation of volumes) and causes the computer node in the side for reference to occupy one volume (hereinafter, referred to as the first volume). During this period, a controller for this disc records all changes by the other computer node to another volume (hereinafter, referred to as the second volume). When the computer node that has referred to the data completes the reference to release occupation of the first volume, the controller for the disc explained above reflects the record of changes for the second volume on the first volume and thereafter places these two volumes to the condition for common use from two computer nodes as a set of storing the same data (re-synchronization of volumes).

The second related art is described from the line 58 on the page 3 to the line 52 on the page 4 of the Japanese Laid-Open Publication No. HEI 6-149485. In this second related art, a semiconductor external storage device is used for the common use among the computer modes. In this method, single memory area is used in common among a plurality of computer nodes and each computer node exclusively accesses such memory area.

Here, the first related art is required to execute separation of volumes and re-synchronization each time when one computer node refers to the data. Therefore, this related art has a problem that it cannot be easily adapted to the real-time process due to its response time.

On the other hand, the second related art is required to execute, for each data transfer, to execute exclusive control for the areas in the computer nodes in the data output side and the data reference side in order to assure the perfection of the records. On the occasion of transferring a large amount of data, there is a problem that the overhead that is required for these exclusive processes becomes large in the number. Moreover, this overhead sometimes lowers the data transfer efficiency.

SUMMARY OF THE INVENTION

A first object of the present invention is to decrease the overhead that is required to execute the exclusive processes impeding improvement in the data transfer efficiency.

A second object of the present invention is to provide a data transfer method that may also be used for the real-time processes.

In the present invention, the data transfer using RDMA (Remote Direct Memory Access) is executed. RDMA is the technique to copy, under the condition that the computer node in the receiving side knows the address of the data to be transmitted of the computer node in the transmitting side or the computer node in the transmitting side knows the address of the data to be received of the computer node in the receiving side, the data in direct between respective main memories of the computer nodes by designating, with the program of one computer node, the area to store/read the data in the main storage of the computer node and the area to read/store the data in the main storage of the other computer node between a couple of computer nodes connected with the network to generate a data copy request among such areas in order to process such request with a communication means or a software to control such communication means.

This RDMA is classified into the RDMA-Write for storing the data in the main storage of the computer node to drive RDMA in the main storage on the other computer node and the RDMA-Read for storing the data in the main storage on the other computer node in the main storage of the computer node to drive RDMA.

RDMA is described, for example, in the Virtual Interface Architecture Specification 1.0 (Dec. 16, 1997) issued by Intel, Compaq and Microsoft in the USA.

In the present invention, one or more records are stored one-sidedly without synchronization (in the non-synchronous procedures) with the desired time interval in the area on the main storage of the first computer node and a program operating on the second computer node realizes data transfer by referring to the relevant area in the desired time interval using the RDMA-Read.

Moreover, a program on the first computer node stores one or more records one-sidedly without synchronization (in the non-synchronous procedures) with the desired time interval in the area on the main storage of the second computer node using the RDMA-Write and a program operating on the second computer node realizes the data transfer by referring to the relevant area in the desired time interval.

BRIEF DESCRIPTION OF THE DRAWINGS

FIG. 6 illustrates a data record table 151.

FIG. 7 illustrates a data record table 251.

FIG. 16 illustrates a data record table 151.

FIG. 17 illustrates a data record table 151.

DESCRIPTION OF THE PREFERRED EMBODIMENTS

A preferred embodiment of the present invention will be explained with reference to the accompanying drawings.

First, the first embodiment of the present invention will be explained with reference to FIG. 1 to FIG. 10.

Figure 1:
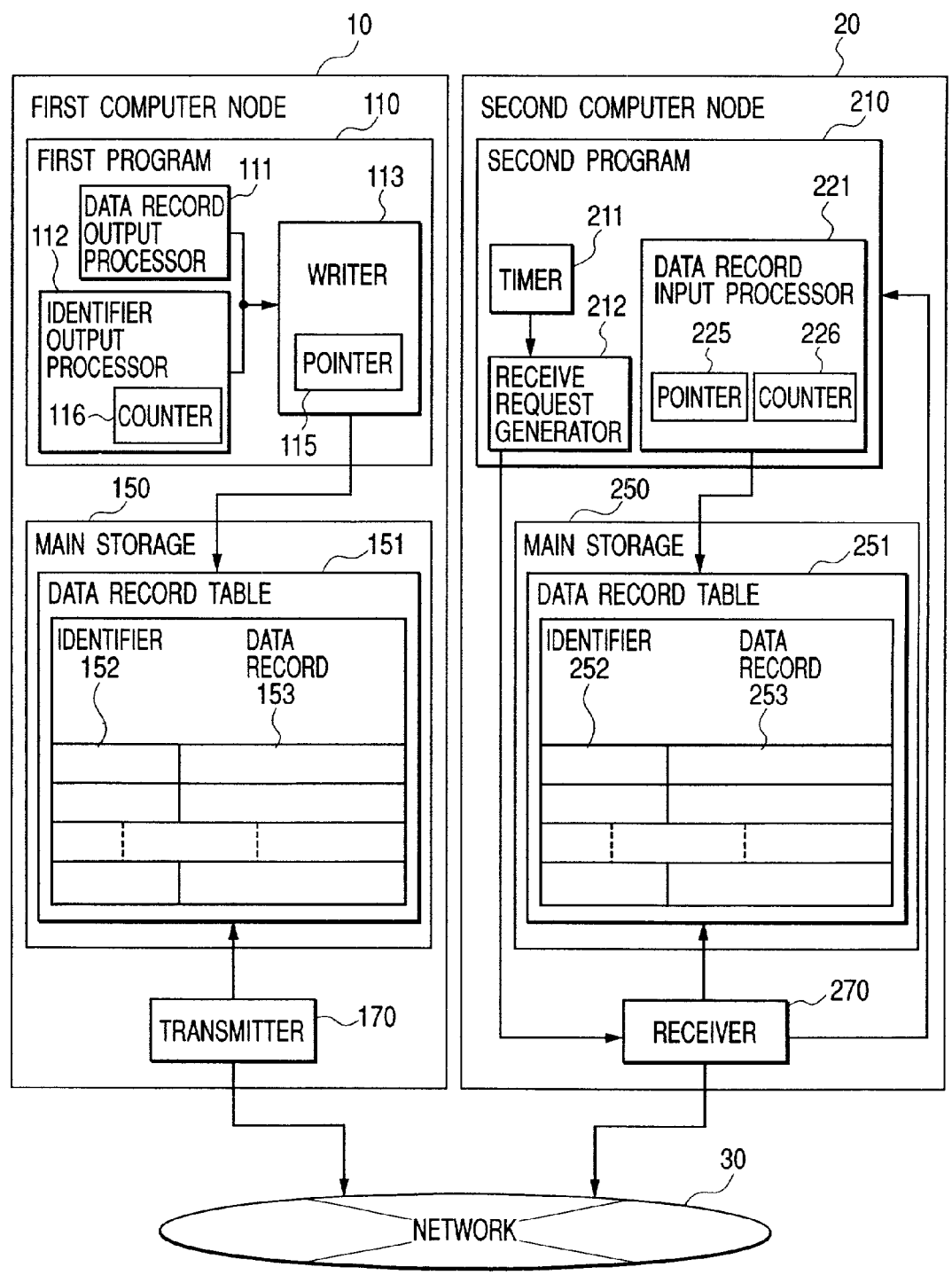
FIG. 1 is a total structural diagram of the first embodiment of the present invention.

FIG. 1 is a total structural diagram illustrating the first embodiment of the present invention. The first computer node 10 and the second computer node 20 are connected with a network 30 and these first computer 10 and the second computer 20 are capable of making communication via the network 30.

The first computer node 10 is provided with a first program 110 for outputting a data record 153 to be transmitted to the second computer node 20, a data record table 151 stored in the main storage 150 to store the data record 153 and a transmitter 170 for transmitting the data record 153 to the second computer 20 via the network 30. The transmitter 170 is formed of a program independent of the first program 110 or of a hardware system. Moreover, the first program 110 is composed of a data record output processor 111 for outputting the data record 153, an identifier output processor 112 for outputting the identifier 152 explained later and a writer 113 for writing outputs of the data record output processor 111 and identifier output processor 112 to the data record table 151. Here, the identifier 152 is the information that can identify at least two data records 153 that are continuously written sequentially and for example, the serial numbers that are given respectively to the data records 153. The identifier output processor 112 is provided with a counter 116 to generate the serial numbers. In addition, the writer 113 also includes a pointer 115 for writing the index (indicating to which entry a certain identifier and data record should be stored) of the entry to be stored in the data record table 151.

Moreover, the data record output processor 111 is used, for example, by OLTP (On Line Transaction Processing) to write the journal data to the data record table 151 and the data record 153 is a journal data, in this example, in the online process.

The second computer node 20 includes the second program 210 that receives and inputs the data record 153 output from the first computer 10, the data record table 251 on the main storage 250 that is the perfect or imperfect duplication of the data record table 151.

Of the first computer 10 and a receiver 270 for receiving the data record 153 from the first computer 10 via the network 30. Moreover, the second program 210 comprises a timer 211, a data receive request generator 212 for generating the receive request of the data record 153 and a data record input processor 221. The timer 211 executes the process to drive the data receive request generator 212 with the constant time interval and may be located at the external side of the second program 210.

Moreover, the data record input processor 221 includes the pointer 225 for writing the index to show the entry to be input and the counter 226 used to check the reasonability of the identifier 252 read out.

A program to generate the data record 153 and a program to execute the other process by inputting the data record 253 are not related in direct to the present invention and therefore these programs are not explained in this embodiment.

Figure 2:
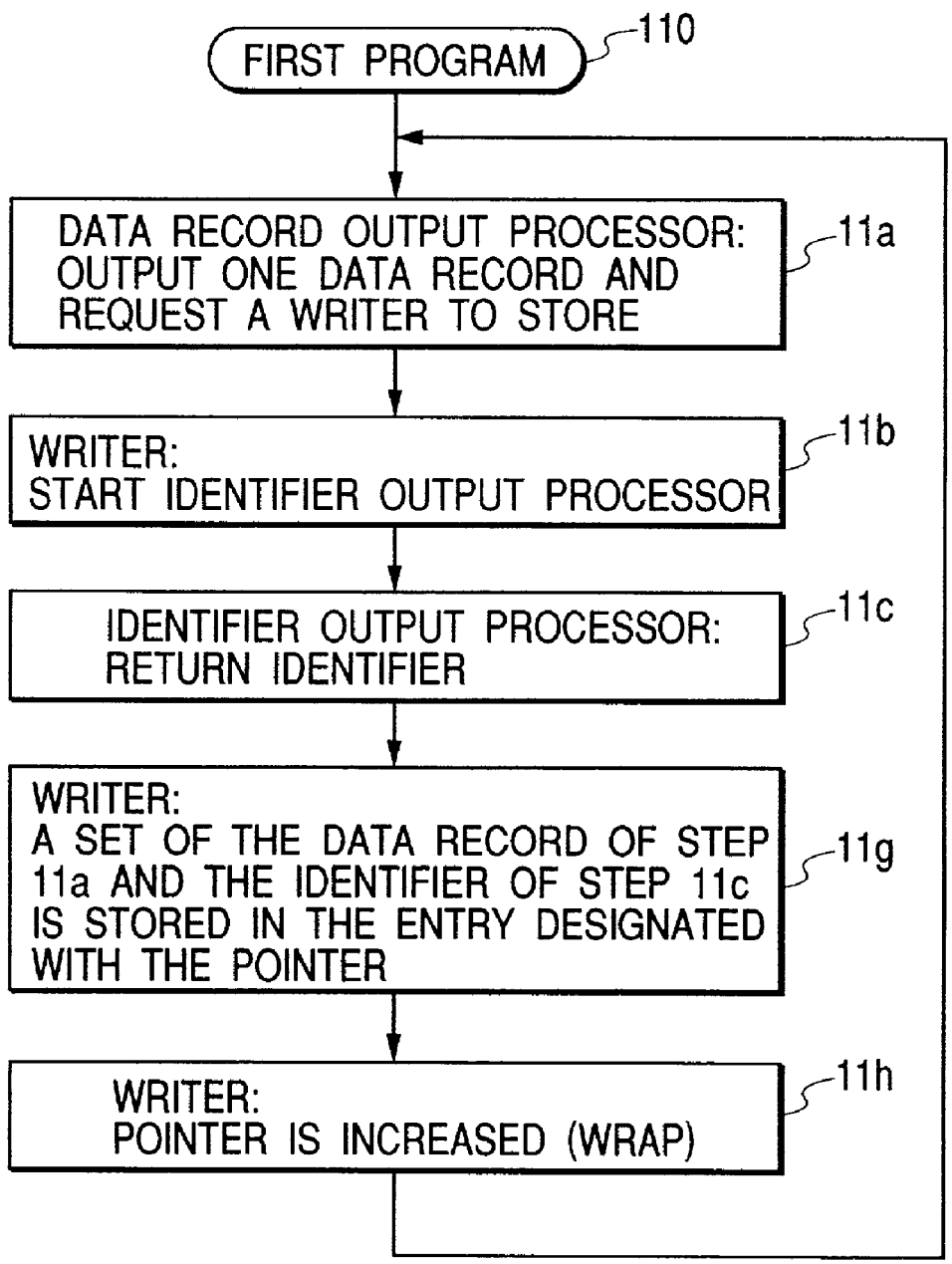
FIG. 2 is a flowchart illustrating the processes of the first program 110.

FIG. 2 is a flowchart illustrating the process of the first program 110 in the first embodiment.

First, the data record output processor 111 outputs only one data record 153 and requests the writer 113 to store the data record 153 to the data record table 151 (step 11a). The writer 113 drives the identifier output processor 112 (step 11b) The identifier output processor 112 outputs the identifier 152 and returns this identifier to the writer 113 (step 11c).

The writer 113 stores a set of the data record 153 of step 11a and the identifier 152 in the step 11c to the entry indicated with the pointer 115 (step 11g). Thereafter, the writer 113 increments the pointer 115 and when the pointer 115 exceeds the maximum value, the wrap process is executed (step 11h). Details of the identifier output processor 112 and writer 113 will be explained later. When the first program 110 outputs a plurality of data record 153, the processes from the step 11a to the step 11h are repeated. The identifier 152 and data record 153 are written to the data record table 151 for each generation of the data record 153 without relation to the second computer node 20.

Figure 3:
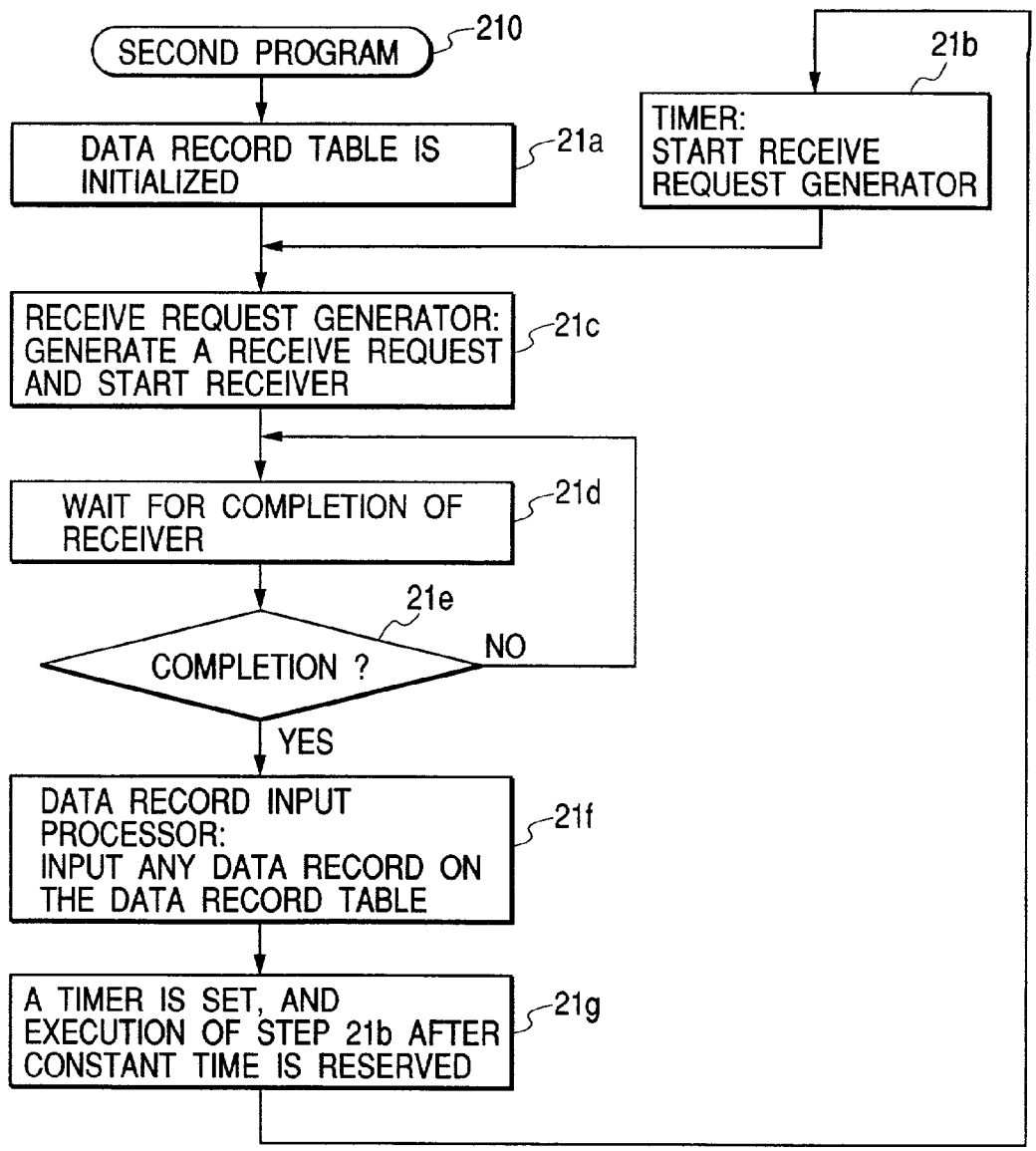
FIG. 3 is a flowchart illustrating the processes of the second program 210.

FIG. 3 is the flowchart illustrating the process of the second program 210 in the first embodiment.

First, the second program 210 initializes the data record table 251 (step 21a). The data record table 251 after initialization will be explained in regard to FIG. 7 and therefore it is not explained here. Next, the data receive request generator 212 regenerates respectively the designated data receive request for the data record table 151 as the input destination and for the data record table 251 as the reception destination (step 21c). Namely, in this case, RDMA-Read is started. In the step 21c, it is also possible to designate any one of all entries of the data record table 151 or 251 or a part of the entry groups for the transmission destination and reception destination. It is more desirable to designate the entry group that the writer 113 stored during the period, from the time when the transmitter 170 read the last entry in the last preceding data transfer, to the time when the transmitter 170 started to read the first entry in present data transfer. When the number of entries included in the entry group changes due to the load of the first computer node 10, the number of entries to be read increases or decreases depending on the load. For example, when a large number of entries have failed in the read operation, the number of entries to be read next is decreased.

Moreover, the second program 210 waits for the completion of data transfer generated in the step 21*c* (step 21*d*, step 21*e*). In addition, the data record input processor 221 inputs the data record table 251 (step 21*f*). The data record input processor 221 will be explained with reference to FIG. 10. Moreover, the second program 210 requests to the timer 211 to continue the process from the step 21*c* after the constant period (step 21*g*). In the step 21*g*, the time interval requested for the timer may be determined freely. As the time interval, it is desirable to decrease response time that the writer 113 designates the time interval to store one or more entries during the period from the time when the transmitter 170 reads the last entry in the present data transfer to the time when the transmitter 170 reads the first entry in the next data transfer. Particularly, in the step 21*f*, when all entries in the present data transfer maybe read, it is desirable to set the time interval to 0 because it is probable that the next data is already stored.

It is desirable to improve the data transfer efficiency that the writer 113 designates, in the current data transfer, the time interval to store the entry corresponding to a half of the data record table 151 during the period from the time when the transmitter 170 reads the last entry until the time when transmitter reads the first entry in the next data transfer. Next, the timer 211 starts the data receive request generator 212 after the constant time (step 21*b*). As explained above, since the data storing operation in the first computer node 10 in regard to RDMA and the data reading operation by RDMA-Read in the second computer node 20 are conducted asynchronously with the desired time interval, the synchronizing procedures are unnecessary in these processes and a load of the program can be reduced.

In the following explanation, 1, m, n are natural numbers exceeding 1 and the numerals 1 and n, and m and n are considered as the prime number relationship with each other. n−1 means the upper limit value of the counter 116, while m indicates the number of entries of the data record table 151 and 1 indicates the number of entries of the data record table 251.

Figure 4:
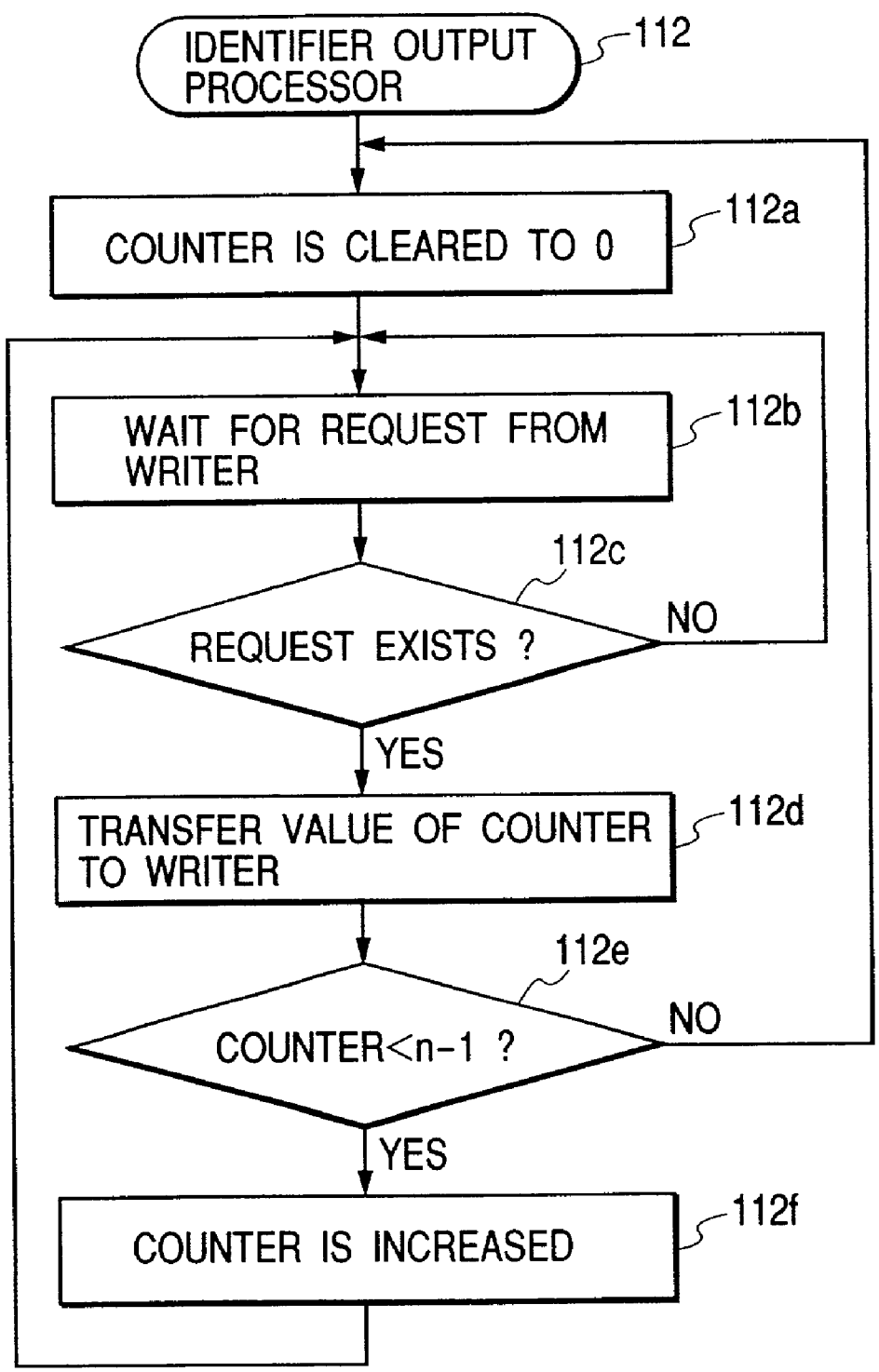
FIG. 4 is a flowchart illustrating the processes of the identifier output processor 112.

FIG. 4 is a flowchart illustrating the process of the identifier output processor 112 in the first embodiment.

First, the identifier output processor 112 clears the counter 116 to 0 (step 112*a*) and waits for the request from the writer 113 (step 112*b*, 112*c*). Here, when a request is issued from the writer 113, the identifier output processor 112 returns the value of counter 116 to the writer 113 (step 112*d*). Here, whether the value of counter 116 is smaller than n−1 or not (step 112*e*) is determined. When determination result is YES, the value of counter 116 is increased (step 112*f*), the process from the step 112*b* is repeated. When determination result is NO, the process from the step 112*a* is repeated.

Figure 5:
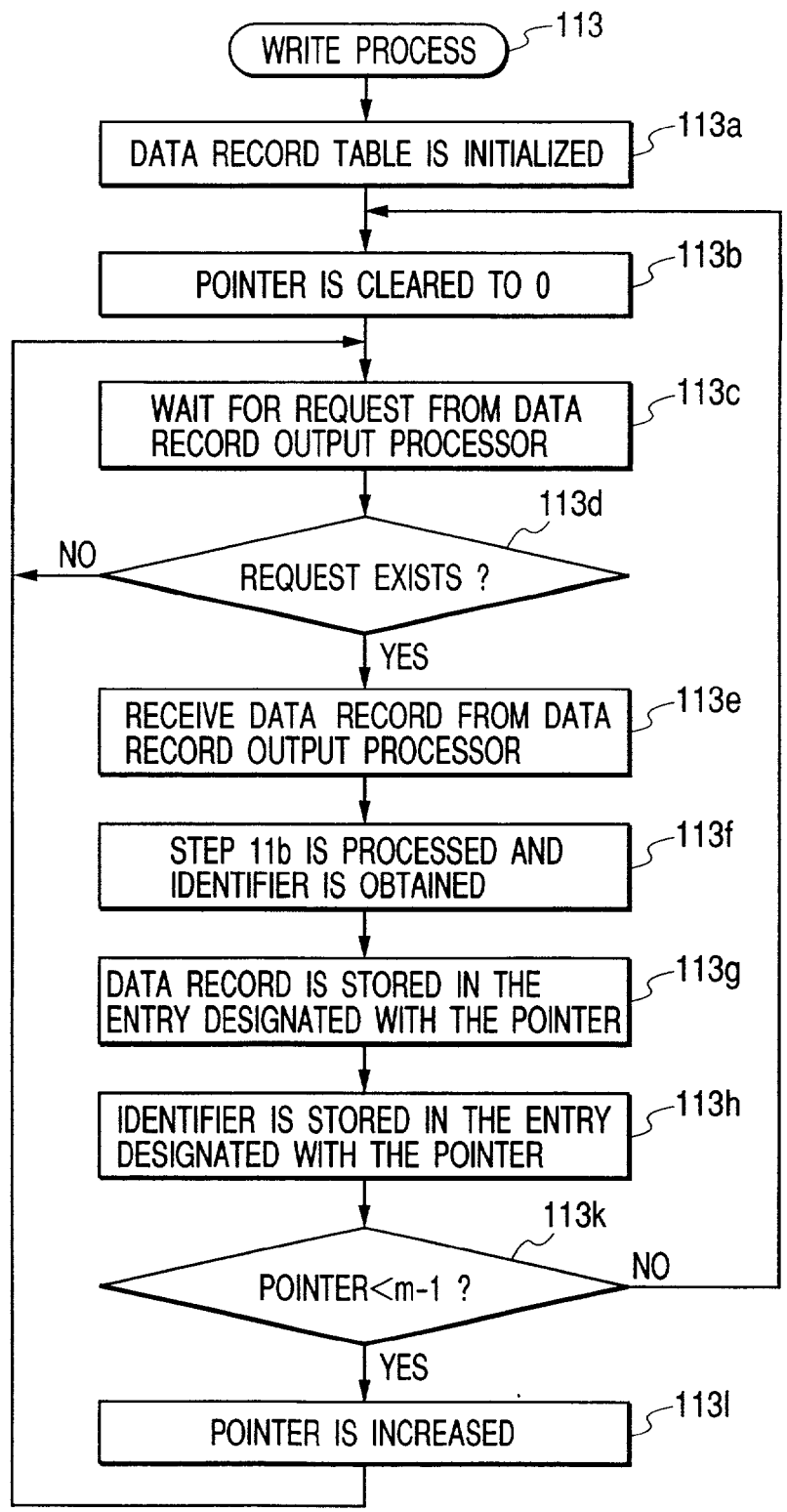
FIG. 5 is a flowchart illustrating the processes of the write process 113.

FIG. 5 is a flowchart illustrating the writer 113 in the first embodiment.

The writer 113 initializes the data record table 151 (step 113*a*). The data record table 151 after initialization will be explained later in regard to FIG. 8. Moreover, the writer 113 clears the pointer 115 to 0 (step 113*b*) and waits for the request from the data record output processor 111 (step 113*c*, step 113*d*). Here, when a request is generated from the data record output processor 111, the writer 113 receives the data record 153 outputted from the data record output processor 111 (step 113*e*) and moreover obtains the identifier 152 from the identifier output processor 112 through the process of the step 11*b* indicated in FIG. 2 (step 113*f*). In addition, the writer 113 stores the data record 153 obtained in the step 113*e* to the entry designated with the pointer 115 in the data record table 151 (step 113*g*) and stores the identifier 152 obtained in the step 113*f* to the entry (step 113*h*). Moreover, the process to increase the pointer is also executed (step 113*k*, step 113*l*).

FIG. 6 illustrates the data record table 151 immediately after the step 113*a*, namely after initialization of the writer 113 in the first embodiment.

The data record table is composed of entry 0 to entry m−1 and corresponds to the entry indicated when the pointer takes 0 to m−1. The writer 113 writes (stores) the identifier 152 of each entry as explained below. Namely, the writer 113 stores −1 to the identifier 152.0 of the entry 0, the numbers increased one by one from 0 in the sequence of 0, 1, 2, . . . to the identifiers from the identifier 152.1 of entry 1 to the identifier 152.m−2 of entry m−2. Here, if the value to be stored in the identifier 152 has exceeded n−1, 0 is stored in the identifier 152 of such entry and subsequently the values increased one by one are also stored. In addition, the writer 113 stores n−1 to the identifier 152.m−1 of entry m−1.

The data record 153 of each entry is initialized with the adequate initial value. However, since these data records 153 are neglected in the data record input processor 221 explained below, initialization is not always required.

FIG. 7 illustrates the data record table 251 immediately after the step 21*a*, namely after initialization of the second program 210 in the first embodiment of the present invention. Only difference from FIG. 6 is that the number of entries is never m but 1.

Figure 8:
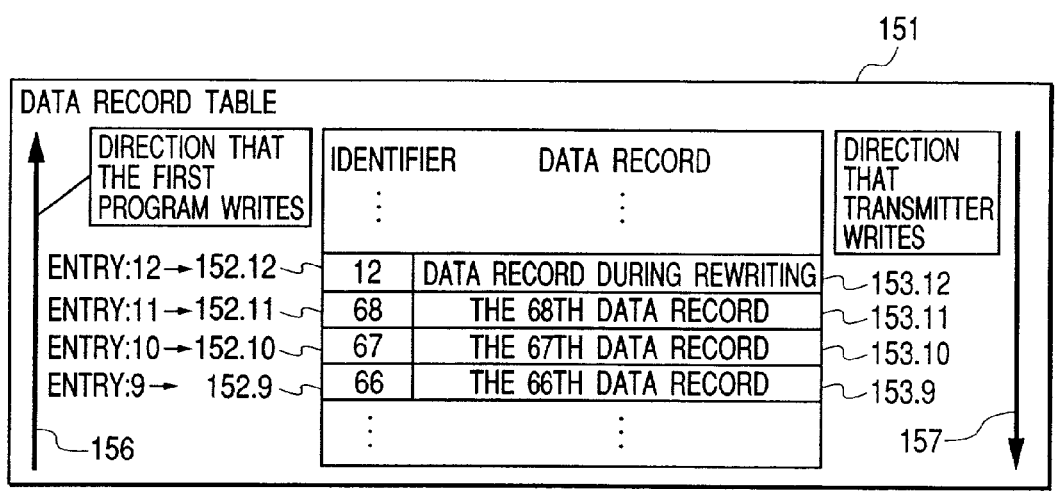
FIG. 8 illustrates a data record table 151.

FIG. 8 illustrates the condition in a certain time when the writer 113 and transmitter 170 are respectively executing the write and read operations to or from the data record table 151 in the first embodiment of the present invention.

The arrow mark 156 indicates the direction in which the writer 113 writes the entry, while the arrow mark 157 the direction in which the transmitter 170 reads the entry. In other words, the writer 113 and transmitter 170 writes and reads the entry in the inverse directions with each other. The reason of such inverse direction is that the inverse passing of the write operation by the writer 113 and read operation by the transmitter 170 can be detected from discontinuation of the identifier 152. Details will be explained hereunder.

The writer 113 writes the entry of data record table 151 in the sequence of data record 153.9 of entry 9, identifier 152.9 of entry 9, data record 153.10 of entry 10, identifier 152.10 of entry 10, . . . and the moment of the inverse passing with the read operation by the transmitter 170 is within the course of updating of the data record 153.12 of entry 12. The transmitter 170 reads the entry of the data record table 151 in the sequence of the identifier 152.12 of entry 12, data record 153.12 of entry 12, identifier 152.11 of entry 11, data record 152.11 of entry 11, . . . .

Here, the attention will be paid to the identifier 152.12, data record 153.12 and identifier 152.11. The writer 113 writes the identifier 152.12 after completion of write operation of the data record 153.12. Therefore, at the timing indicated in FIG. 8, the value (12, in practical) before the writing by the write process 113 is still remained in the identifier 152.12 and this value is not continuous from the value (68, in practical) of identifier 152.11. In this case, the transmitter 170 already reads the identifier 152.12 and thereafter reads the identifier 152.11. Therefore, if inverse passing explained above is generated, the identifier 152.11 and identifier 152.12 are not continuous. Discontinuity means that the entry 12 includes the data record under the rewriting condition, unless if the writer 113 and transmitter 170 execute the write and read operations in the same sequence.

Figure 9:
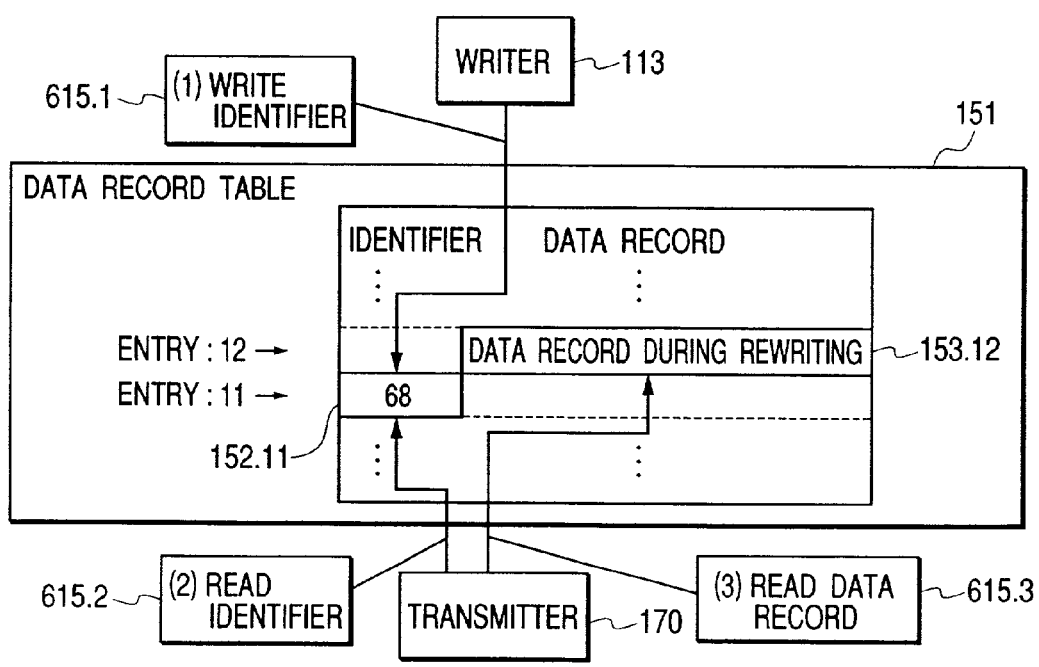
FIG. 9 is a diagram (1) for explaining the condition of the data record table when the read and write operations are executed in the same direction.

It will be explained with reference to FIG. 9 and FIG. 10. FIG. 9 illustrates the condition that the read operation catches up with the write operation. The writer 113 writes the identifier 152.11 (615.1) and thereafter the transmitter 170 reads this identifier (615.2). Thereafter, the transmitter 170 reads the data record 153.12 (615.3) but this data record 153.12 is read as the incorrect value because the writer 113 does not yet complete the write operation. The subsequent process is illustrated in FIG. 10.

Figure 10:
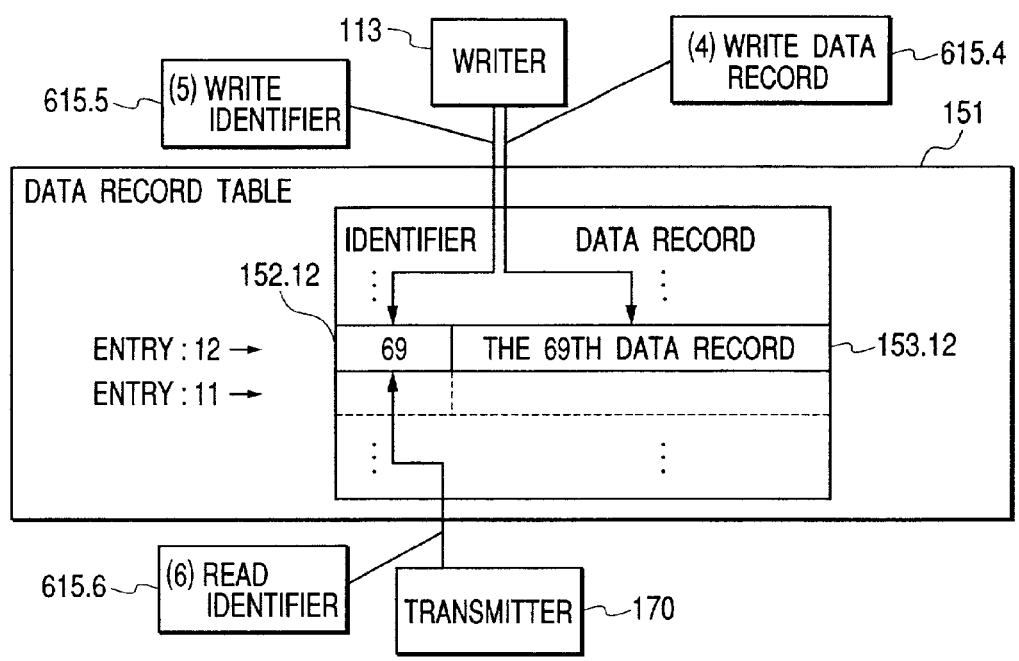
FIG. 10 is a diagram (2) for explaining the condition of the data record table when the read and write operations are executed in the same direction.

In FIG. 10, the writer 113 writes the data record 153.12 (615.4). Thereafter, the writer 113 writes the identifier 152.12(615.5) and thereafter the transmitter 170 reads such identifier (615.6). But, this identifier 152.12 is read as the correct value (69, in practical). Namely, the identifier 152.11 read by the transmitter 170 and the identifier 152.12 become continuous. As explained above, when the write operation by the writer 113 and the read operation by the transmitter 170 are performed in the same sequence, the identifiers are read as the continuous ones, in spite that the $69^{th}$ data record is read as the incorrect value as indicated in FIG. 9. Accordingly, it is not assured only from the continuity of the identifier 152 that the data record 153 is read correctly.

Figure 11:
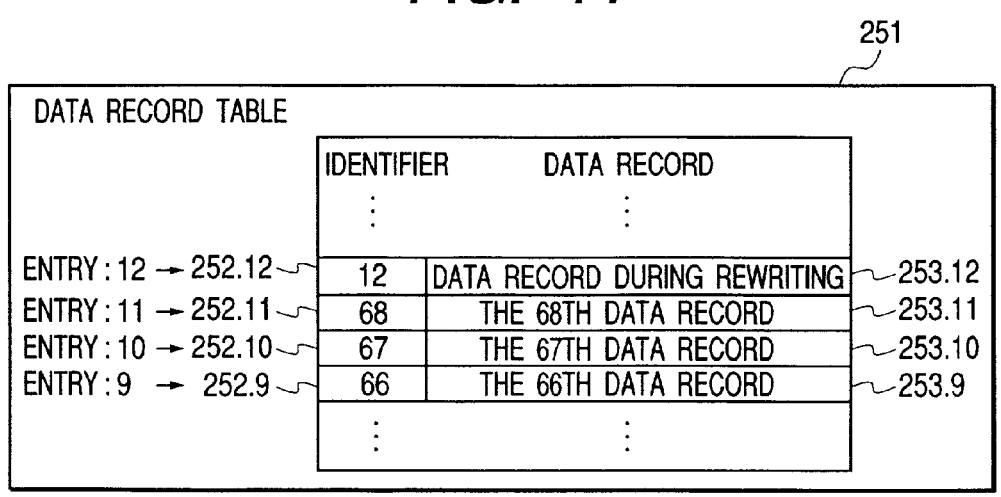
FIG. 11 illustrates a data record table 251.

FIG. 11 illustrates the data record table 251 of the first embodiment of the present invention where the data record table 151 of FIG. 8 is transferred to the second computer node 20 with the transmitter 170 and receiver 270.

As explained in regard to FIG. 8, the identifier 252.9 of entry 9 to the identifier 252.11 of entry 11 are continuous as from 66 to 68, indicating that the data records 253.9 to 253.11 are written in correct. Moreover, the identifier of the data record 253.12 is 12 and is not continuous, indicating that the data record 253.12 has been read during the rewriting.

Figure 12:
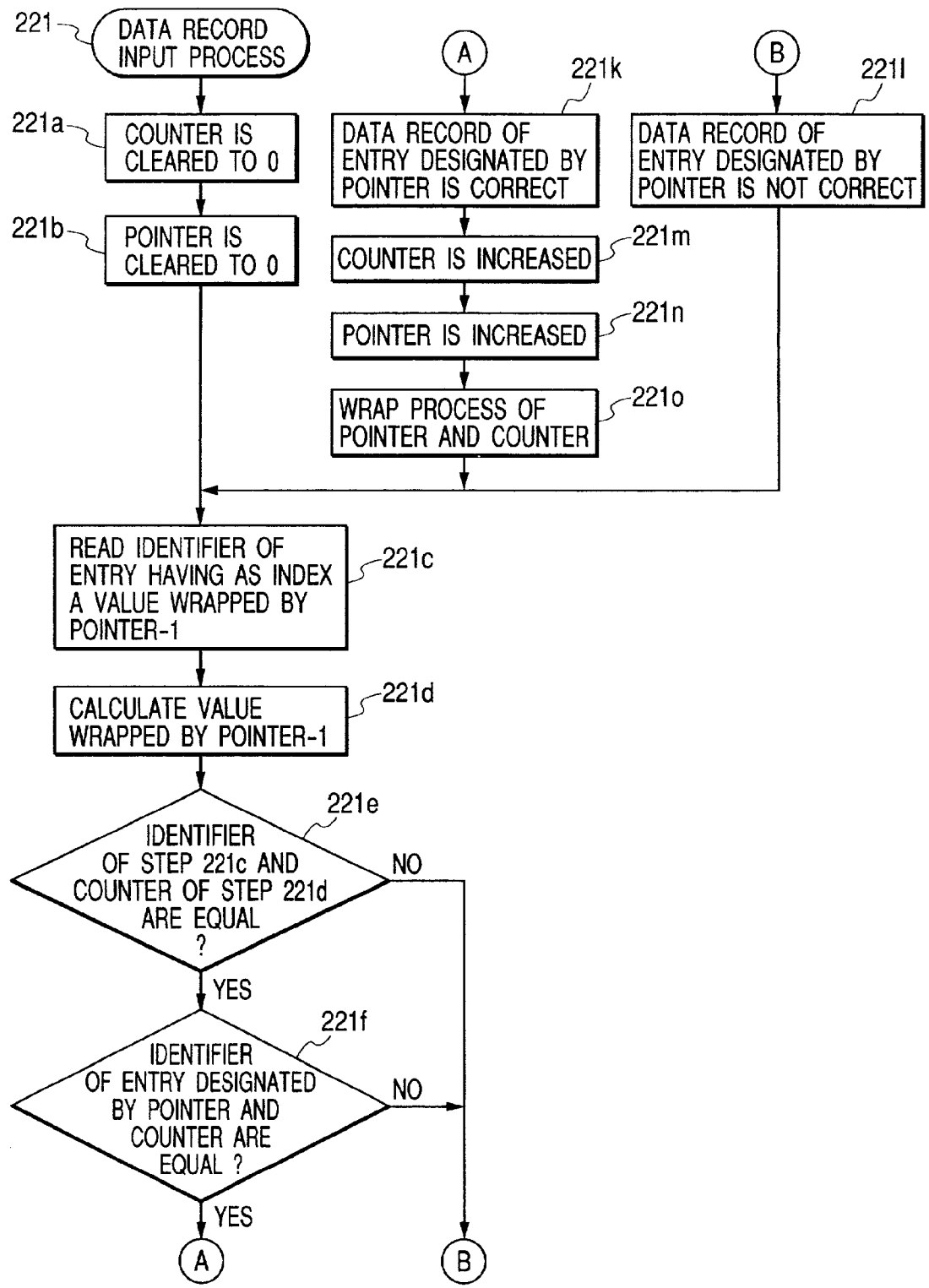
FIG. 12 is a flowchart illustrating the contents of the data record input process 221.

FIG. 12 illustrates a flowchart indicating content of the data record input processor 221 of the first embodiment. Here, which identifier is continuous on the entry or which data record of entry is illegal can be known.

First, the data record input processor 221 clears the counter 226 to 0 (step 221a) and also clears the pointer 225 to 0 (step 221b). Next, in order to confirm whether the identifier 252 of the entry only before the entry indicated by the pointer 225 is correct or not, the number obtained by subtracting one from the value of pointer 225 and being wrapped by 0, the identifier 225 of the entry having such number as the index is read (step 221c) and the value obtained by wrapping the number obtained by subtracting one from the counter 226 is obtained (step 221d). Here, whether the identifier 225 in the step 221c is equal to the value in the step 221d or not is determined (step 221e). When result is YES, the process goes to the step 221f and when the result is NO, the process goes to the node B. Although details will be explained later, the process from the node B is identical to the process executed when the data record of entry indicated by the pointer 225 is not correct. In the step 221f, the data record input processor 221 determines whether the identifier 252 of entry designated by the pointer 225 is identical to the value of counter 226 or not. When the result is YES, the process goes not the node A and when the result is NO, the process goes to the node B. When the node A designated, the data record input processor 221 determines that the data record 253 of entry designated with the pointer 225 is correct and refers to the data record 253 (step 221k). Moreover, the data record input processor 221 increases the counter 226 (step 221m), also increases the pointer 225 (step 221n), executes the wrap process of the pointer 225 and counter 226 (step 221v) and then goes to the step 221c. When the node B is designated, the date record input processor 221 determines that the data record 253 of entry designated with the pointer 225 is not correct and does not refer to the data record 253 (step 221l). Moreover, the data record input processor 221 does not change the values of pointer 225 and counter 226 and repeats the process from the step 221c. Moreover, the information about the data record 253 that is determined as the incorrect data record is outputted and is used in the other process to refer to the data record 253.

Here, when the data record is determined as the incorrect one, the pointer 115 is not increased. Therefore, in the next data transfer, the data records of some entries including the entry designated by this pointer 115 are transferred again after the adequate time interval.

In the first embodiment of the present invention, the load of CPU can be saved very effectively.

Next, difference between the second embodiment and the first embodiment of the present invention will be explained with reference to FIG. 13 to FIG. 18.

Figure 13:
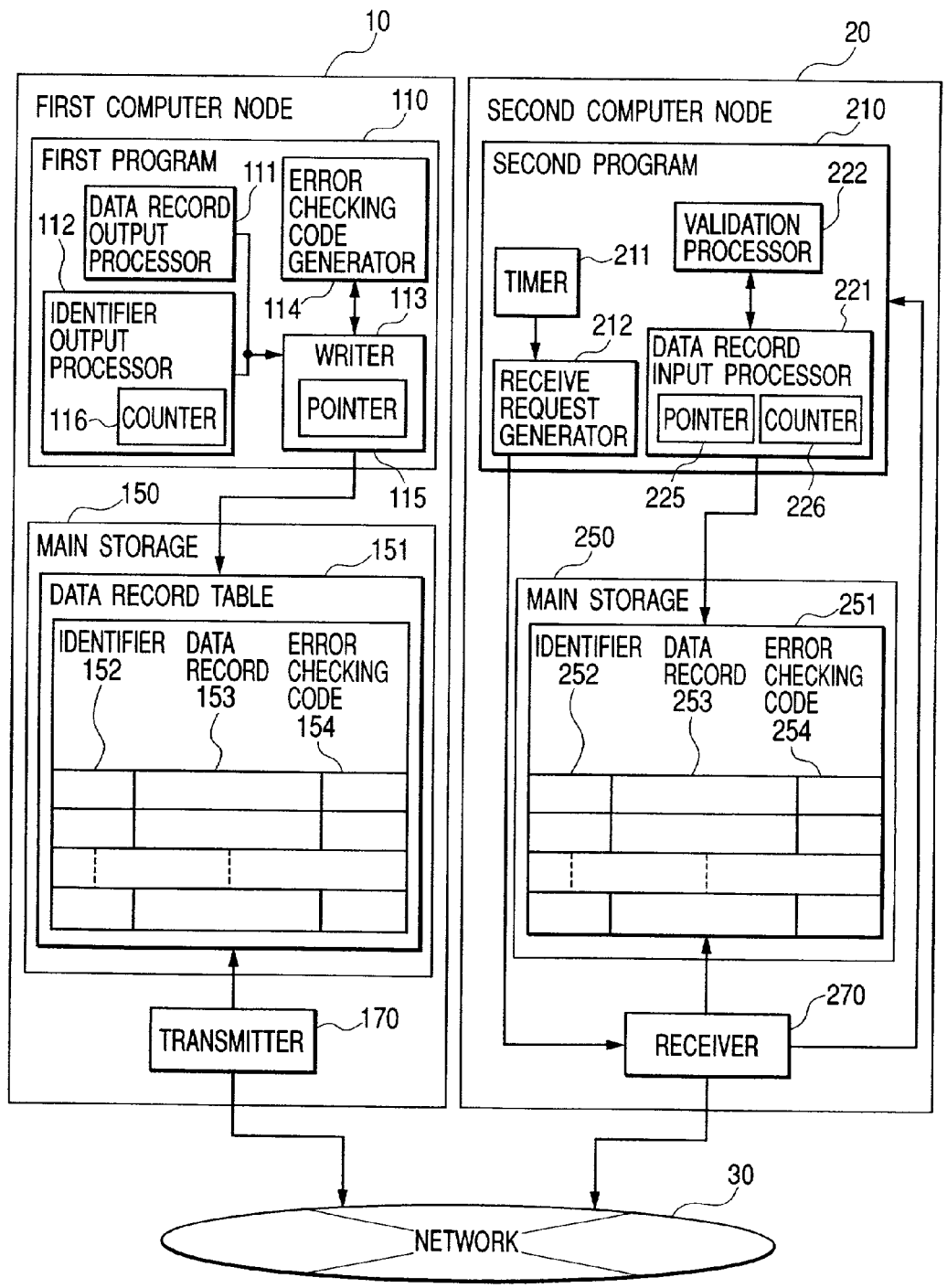
FIG. 13 is a total structural diagram of the second embodiment of the present invention.

FIG. 13 illustrates the total structural diagram of the second embodiment of the present invention. Difference from FIG. 1 is that the first program 110 includes an error checking code generator 114, the second program 210 includes a validation processor 222, the data record table 151 includes an error checking code 154 and the data record table 251 includes an error checking code 254.

The error checking code generator 114 generates the error checking code 154 from a set of the identifier 152 of data record entry and data record 153. The validation processor 222 checks whether the error checking code 254 is the code (correct) generated from a set of the identifier 252 of the data record entry and data record 253 or not (incorrect). Here, the reason why the error checking code is employed will be explained briefly. In the first embodiment, the method of detecting incorrect data by reading the data for transfer in the direction opposed to the direction for writing the data record such as journal data to the data record table 151 has been employed but the method of reading the data in the same direction as the writing of data is assumed. Thereby, correctness of the data record is assured utilizing the error checking code.

Figure 14:
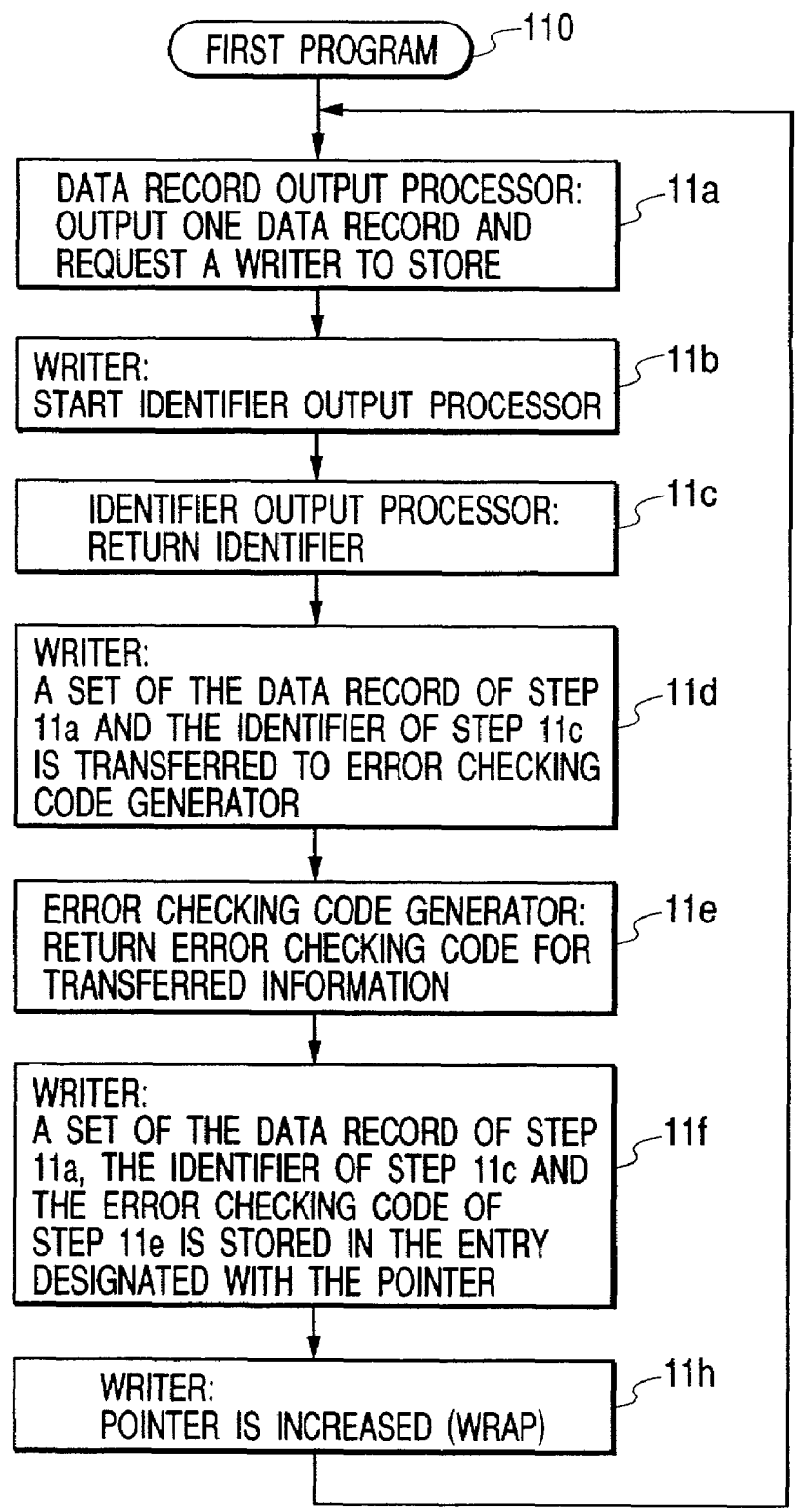
FIG. 14 is a flowchart illustrating the processes of the first program 110.

FIG. 14 illustrates a flowchart indicating the processes of the first program 110 in the second embodiment of the present invention.

Difference from FIG. 2 is that the steps 11d, 11e and 11f are included but the step g is not included. In the step 11d, the writer 113 transfers a set of the data record 153 of step 11a and identifier 152 of step 11c to the error checking code generator 114. In the step 11e, the error checking code generator 114 generates the error checking code 154 from the information transferred in the step 11d and returns this code to the writer 113. In the step 11f, the writer 113 stores a set of the data record 153 of step 11a, identifier 152 of the step 11c and error checking code 154 of the step 11e to the entry designated with the pointer 115.

Figure 15:
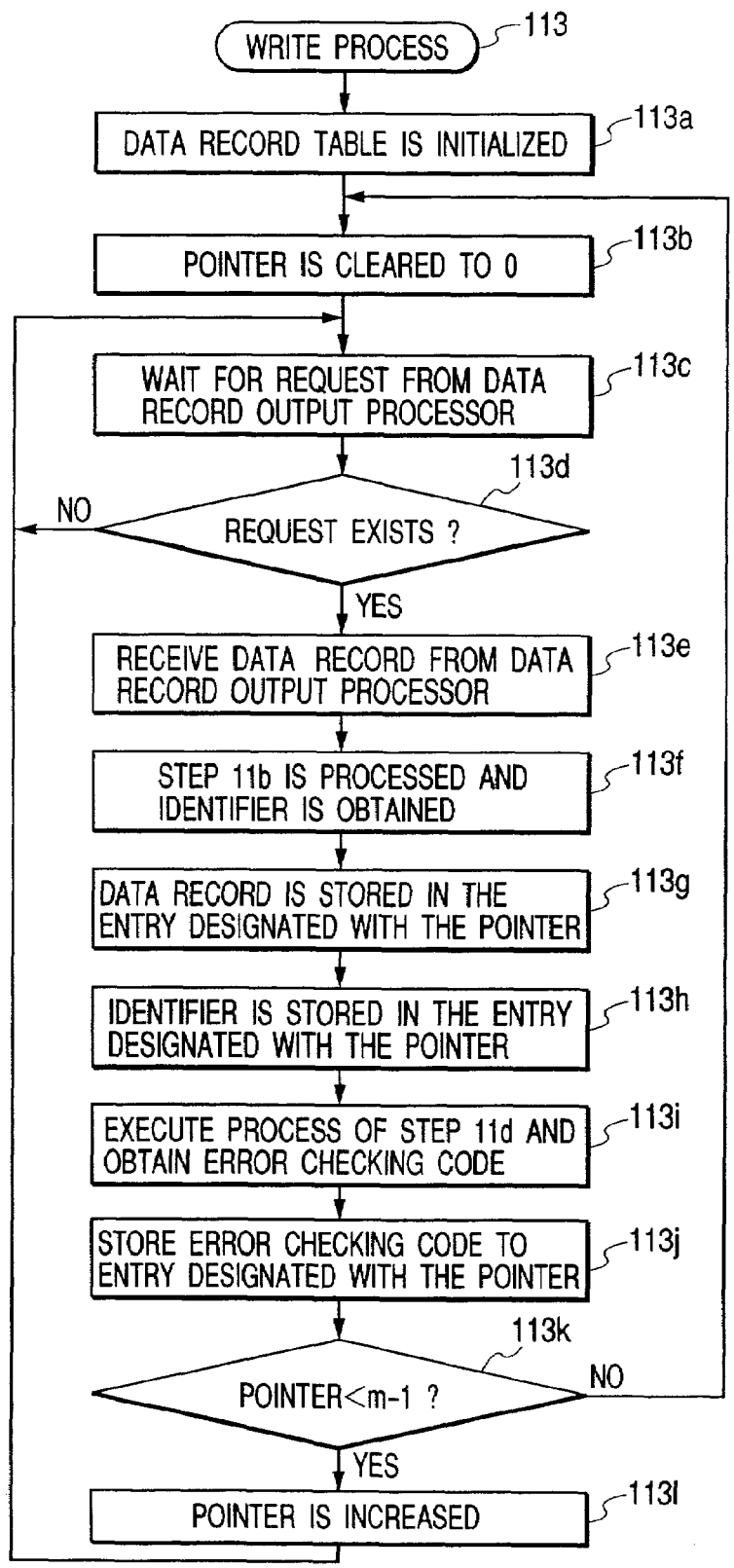
FIG. 15 is a flowchart illustrating content of the write process 113.

FIG. 15 illustrates a flowchart indicating content of the writer 113 in the second embodiment of the present invention.

Difference from FIG. 5 is that the steps 113i and 113j are included. In the step 113i, the writer 113 executes the process of step 11d indicated in FIG. 14 to obtain the error checking code 154 from the error checking code generator 114. In the step 113j, the writer 113 stores the error checking code 154 obtained in the step 113i to the entry designated with the pointer 115.

FIG. 16 illustrates the data record table 151 after initialization in the second embodiment of the present invention.

Difference from FIG. 6 is that the error checking code 154 is included and the data record 153 must always be initialized, because if the data where the data record is matched with the error checking code is still left although it is old data, it becomes difficult to discriminate whether such data is the newly stored correct data or old data (incorrect data). The writer 113 stores, in the step 113a, these error checking codes 154, as the value other than the error checking code, namely incorrect code generated from identifier 152 and data record 153.

FIG. 17 illustrates the condition of a certain time of the data record table 151 in the second embodiment of the present invention.

Difference from FIG. 8 is that the error checking code 154 is included. Here, it is assumed that the transmitter 170 reads the relevant entry during the period when the writer 113 is writing the data to the data record 153 of the entry 12. In this case, since the error checking code 154.12 of entry 12 is not the error checking code generated from the relevant entry, such code becomes incorrect code. The codes from the other error checking code 154.9 to the error checking code 154.11 in FIG. 17 are error checking codes generated by respective entries and therefore these codes are correct codes.

Figure 18:
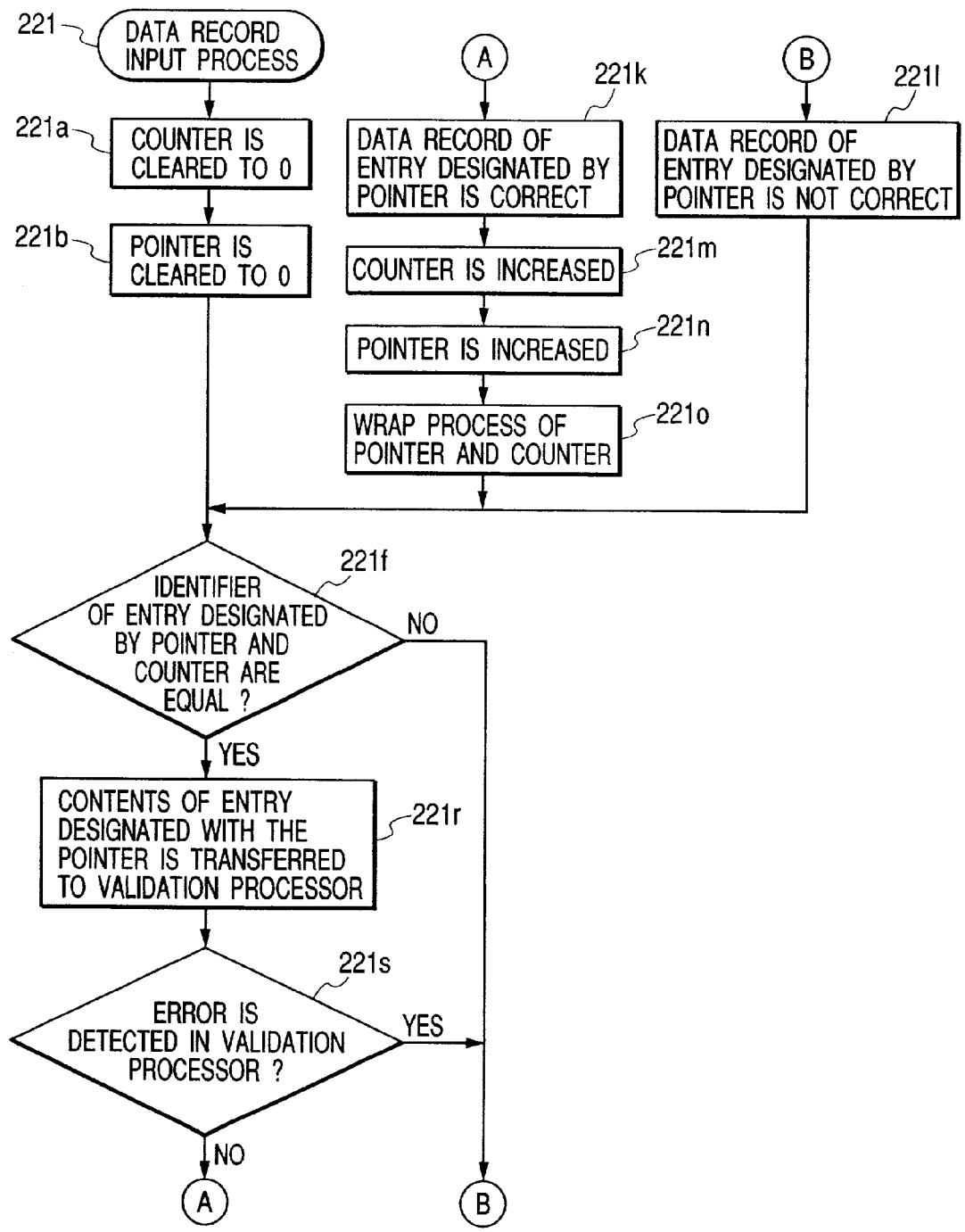
FIG. 18 is a flowchart illustrating content of the data record input process 221.

FIG. 18 illustrates a flowchart indicating content of the data record input processor 221 in the second embodiment of the present invention. Here, it is determined whether the data record read with the error checking code is correct or not.

Difference from FIG. 12 is that the steps 221r and 221s are included and the steps from 221c to 221e are not included. In the step 221r, the data record input processor 221 transfers the entry designated with the pointer 225 to the validation processor 222.

In the step 221s, the data record input processor 221 determines whether an error is included in the relevant record or not from the result of validation processor 222. When the result is YES, the process goes to the node B and when the result is NO, the process goes to the node A.

In the second embodiment of the present invention, correctness of data record can be assured even when the read sequence is set in the identical direction.

Next, difference between the third embodiment and the first embodiment of the present invention will be explained with reference to FIG. 19 to FIG. 22.

Figure 19:
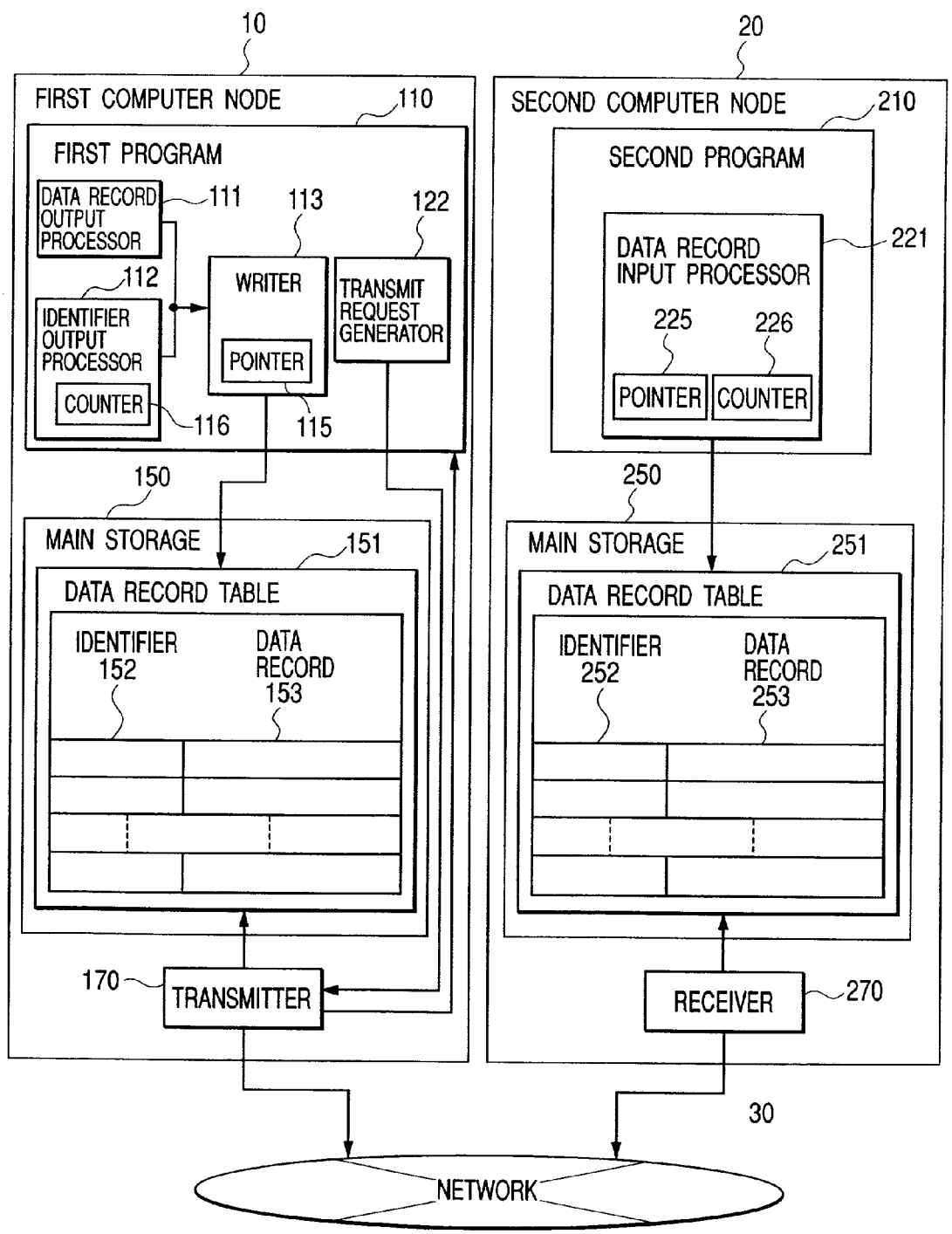
FIG. 19 is a total structural diagram of the third embodiment of the present invention.

FIG. 19 is a total structural diagram of the third embodiment of the present invention. Difference from FIG. 1 is that the first program 110 includes a data transmit request generator 122 and the second program 210 does not include the timer 211 and a data receive request generator 212. The data transmit request generator 122 generates a transmit request of data record table 151 to the transmitter 170. Namely, it is indicated that the data transfer is conducted under the control of the transmitter side using the RDMA-Write. In this case, the first computer node introduces the transfer system where the load is heavier than that in the structure of FIG. 1 but the synchronization is not established and therefore a load becomes smaller than that in the prior art. The data transmit request generator 122 causes the transmitter 170 to read the data when a certain amount of transmitting data is collected. Data transfer can be executed when the second program recognizes the request of data transfer through the polling.

Figure 20:
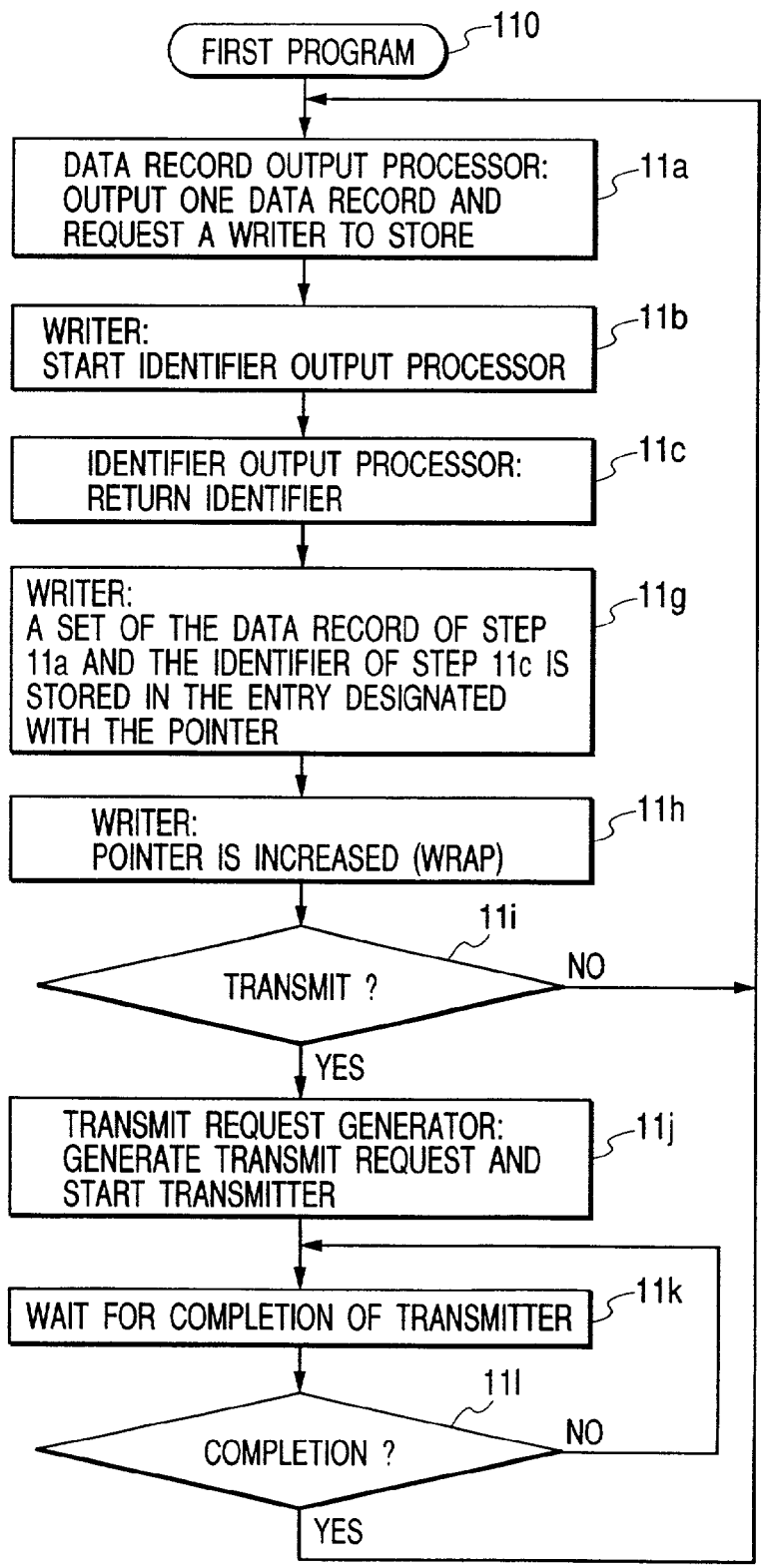
FIG. 20 is a flowchart illustrating the processes of the first program 110.

FIG. 20 illustrates a flowchart indicating the process of the first program 110 in the third embodiment of the present invention.

Difference from FIG. 2 is that the steps from 11i to 11l are included. In the step 11i, the first program 110 determines whether the data record table 151 should be transmitted or not. Namely, interval of data transmission can be set freely in the third embodiment of the present invention. In order to decrease response time, it is preferable that the time interval is shortened, namely the result YES is obtained in the step 11i as many times as possible. The time interval of data transmission can be adjusted in the step 11i by the data transmit request processor 122.

In order to improve the data transfer efficiency, it is preferable that the result YES of the step 11i is obtained when the writer 113 stores the entry corresponding to a half of the data record table 151 during the period from the time when the data has been transmitted finally to the current time.

When the result is YES, the process goes to the step 11j and when the result is NO, the process goes to the step 11a. In the step 11j, the data transmit request generator 122 generates a data transmit request to start the transmitter 170. Moreover, in the steps 11k and 11l, the first program 110 waits for completion of transmission started in the step 11j. Thereafter, the first program 110 continues the process from the step 11a. In the third embodiment of the present invention, the second program 210 only continues the process in the step 21f designated in FIG. 3.

In the third embodiment of the present invention, the writer 113 executes the same process as that indicated in FIG. 5, resulting in only difference that the sequence of steps in the step 113g and step 113h may be exchanged. In the third embodiment of the present invention, the sequence of write and read operations of the data record table 151 is not required to follow the sequence indicated in FIG. 8.

Figure 21:
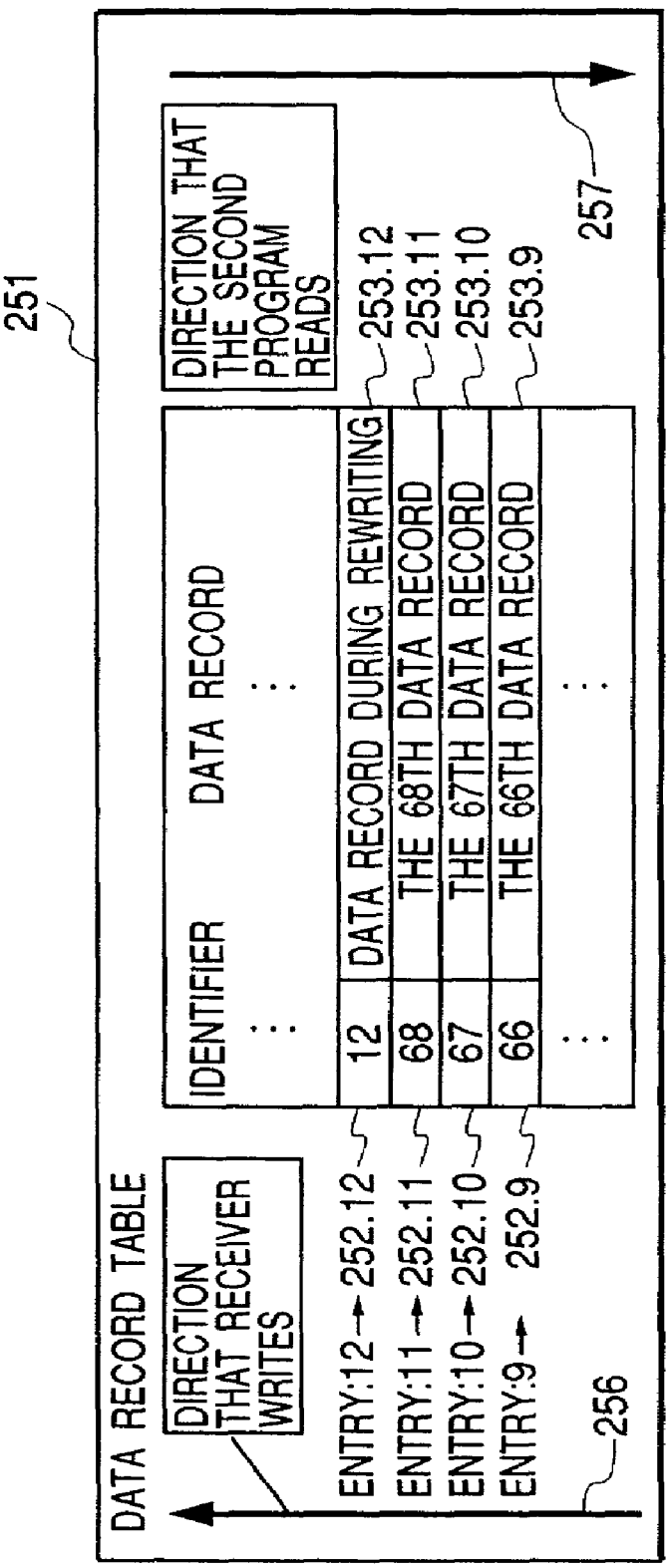
FIG. 21 illustrates a data record table 251.

FIG. 21 illustrates the data record table 251 in which the data record table 151 is transferred to the second computer node 20 with the transmitter 170 and receiver 270 in the third embodiment of the present invention.

The arrow mark 256 indicates the direction in which the receiver 270 reads the entry, while the arrow mark 257 indicates the direction in which the second program 210 reads the entry. Whether the data record 253 has been read correctly or not can be determined in the same manner as the first embodiment of the present invention.

Figure 22:
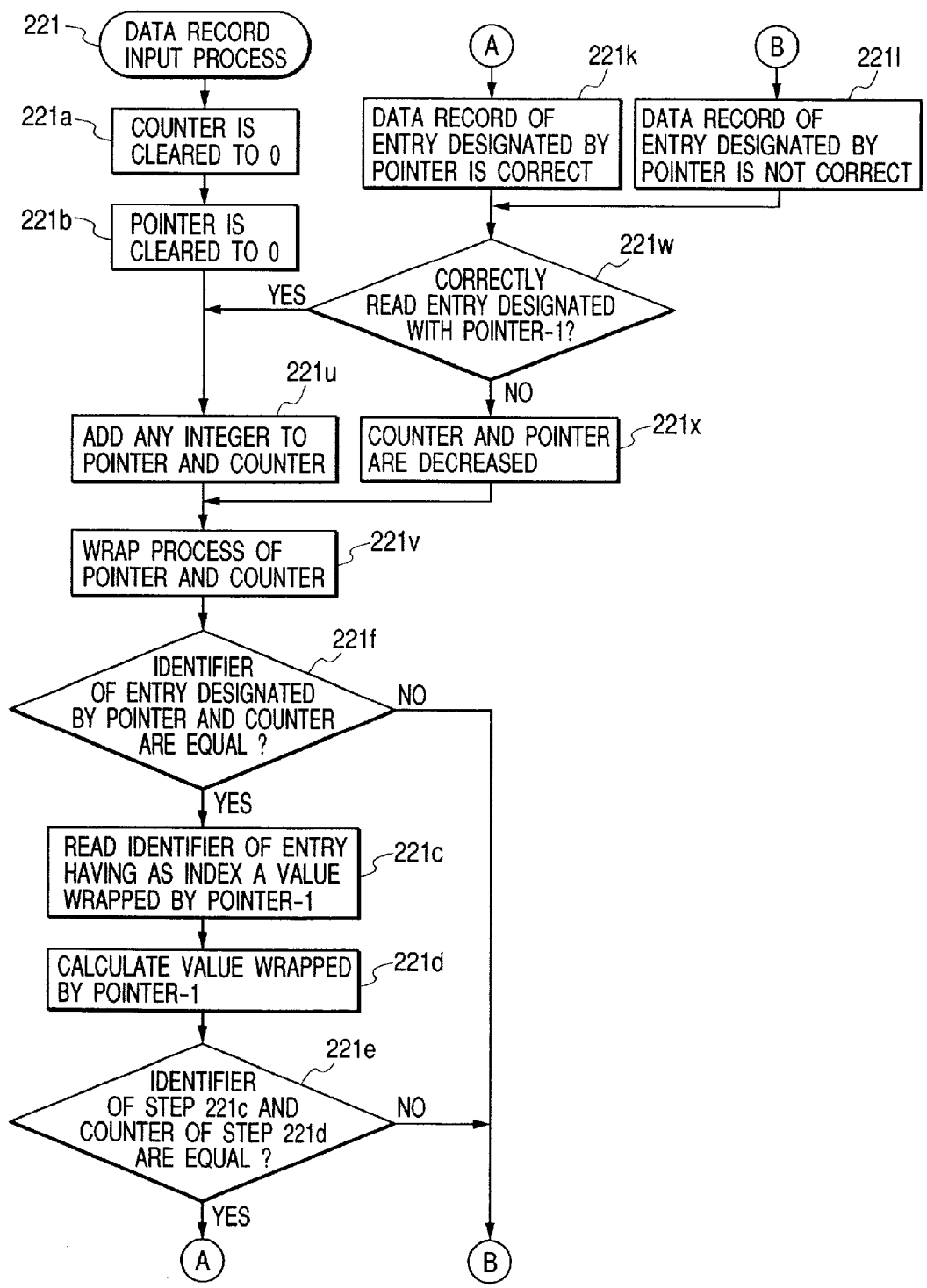
FIG. 22 is a flowchart illustrating content of the data record input process 221.

FIG. 22 illustrates a flowchart indicating content of the data record input processor 221 in the third embodiment of the present invention.

FIG. 22 includes, unlike FIG. 12, the steps from 221v to 221x and executes the step 221f before the step 221c. Namely, according to the third embodiment of the present invention, the data record input processor 221 refers to the identifiers 252 from that having a larger index. In the step 221v, the data record input processor 221 adds the same desired natural number respectively to the pointer 225 and counter 226. Here, it is preferable that the natural number should be the maximum number that provides the result YES in the subsequent step 221f. However, since it is difficult to forecast the optimum value, the natural number added in the preceding step 221v is stored previously and in the present step 221v, the number that is obtained by reading incorrect record from the process in the preceding step 221v from such natural number or the number near to such number is designated.

When the result in the step 221f is YES, the data record input processor 221 goes to the step 221c and when the result is NO, the same data record input processor 221 goes to the node B. In the step 221W, the data record input processor 221 determines whether the entry (entry 1–1 when the pointer 225 is 0) indicated by the value obtained by subtracting 1 from the pointer 225 is already read correctly or not.

When the result is YES, the data record input processor 221 goes to the step 221v and when the result is NO, it goes to the step 221x. In the step 221x, the data record input processor 221 decreases the counter 226 and pointer 225, respectively. In the third embodiment of the present invention, application is possible to the data transfer not supporting RDMA-Read.

Next, difference between the fourth embodiment and second embodiment of the present invention will be explained with reference to FIG. 23 to FIG. 24.

Figure 23:
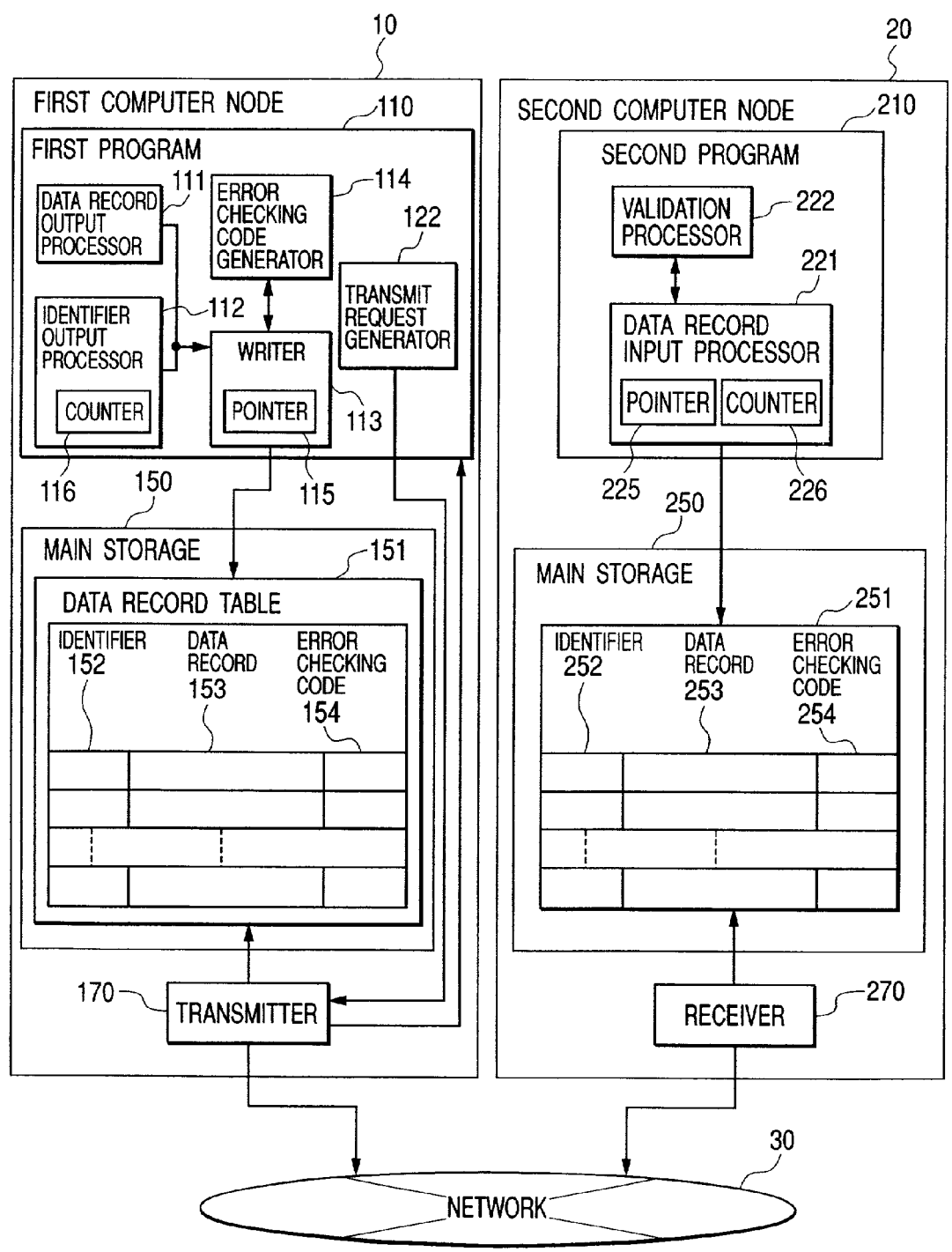
FIG. 23 is a total structural diagram of the fourth embodiment of the present invention.

FIG. 23 is a total structural diagram of the fourth embodiment. In FIG. 23, the first program 110 includes the data transmit request generator 122 and the second program 210 does not include the timer 211 and data receive request generator 212, unlike FIG. 13. The data transmit request generator 122 is same as that in the third embodiment of the present invention.

Figure 24:
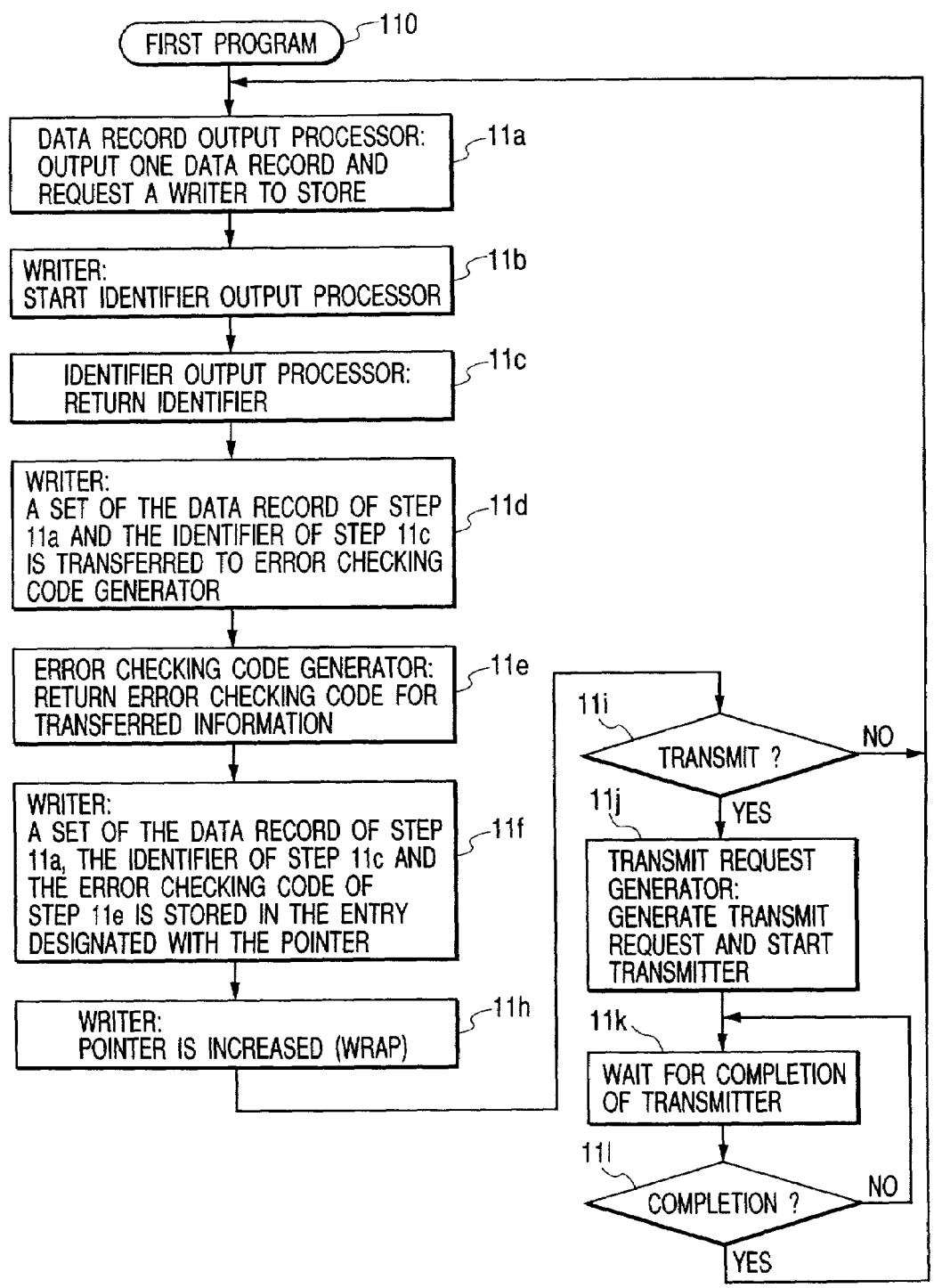
FIG. 24 is a flowchart illustrating the processes of the first program 110.

FIG. 24 illustrates a flowchart indicating the process of the first program 110 in the fourth embodiment of the present invention.

FIG. 24 includes the steps from 11j to 11l, unlike FIG. 14. These steps are same as that in the third embodiment of the present invention. In the fourth embodiment of the present invention, the read sequence is identical to the write sequence and application to the data transfer not supporting RDMA-Read is also possible.

Figure 25:
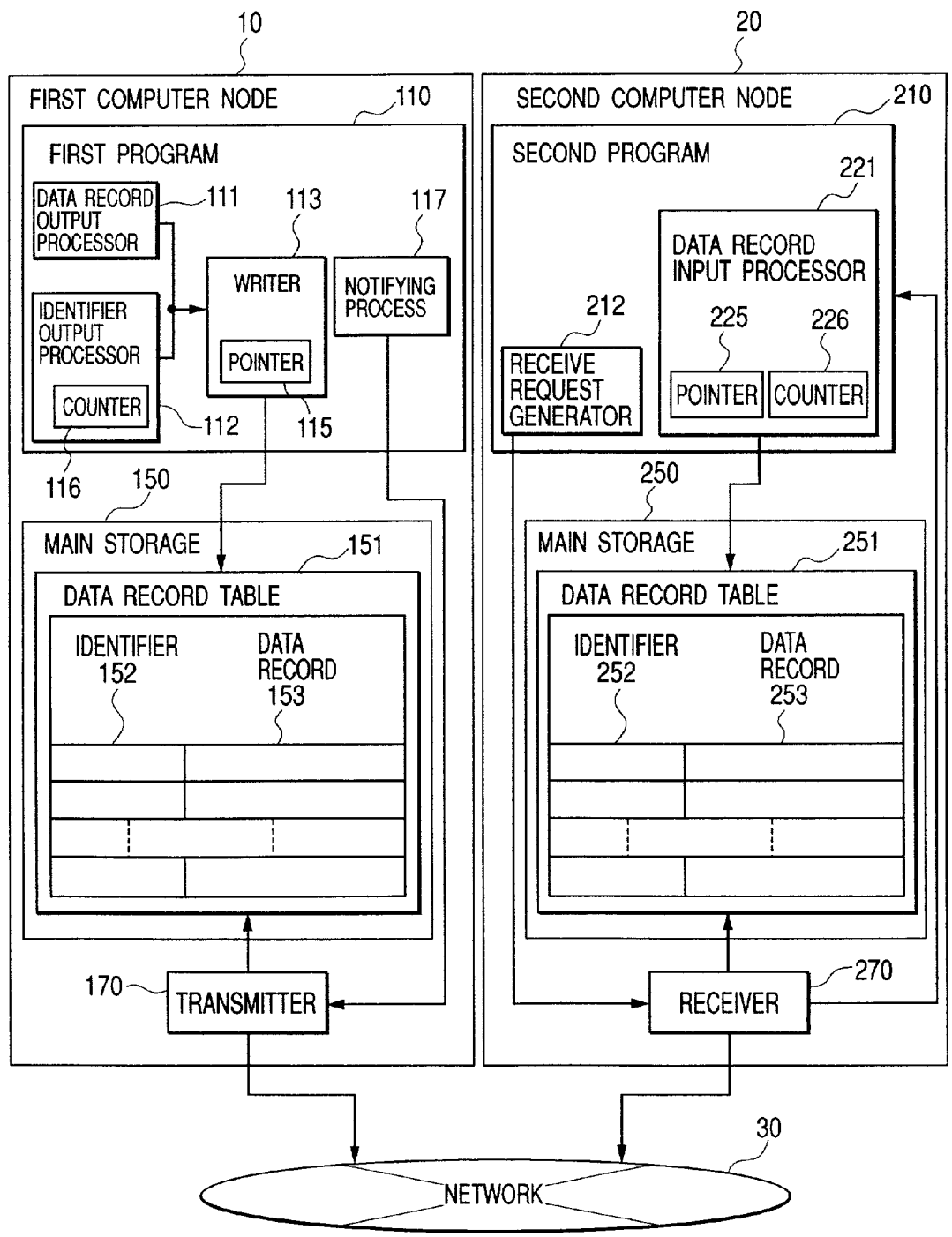
FIG. 25 is a total structural diagram of the fifth embodiment of the present invention.

Next, difference between the fifth embodiment and the first embodiment of the present invention will be explained with reference to FIG. 25 to FIG. 27. FIG. 25 is a total structural diagram of the fifth embodiment of the present invention. Unlike FIG. 1, FIG. 25 includes a notifying processor 117 in the first program 110 but does not include the timer 211 in the second program 210. The notifying processor 117 causes the transmitter 170 when a certain amount of data records are collected to read such data records and also gives a timing to read such data record to the second program through the interruption of RAMA-Write.

Figure 26:
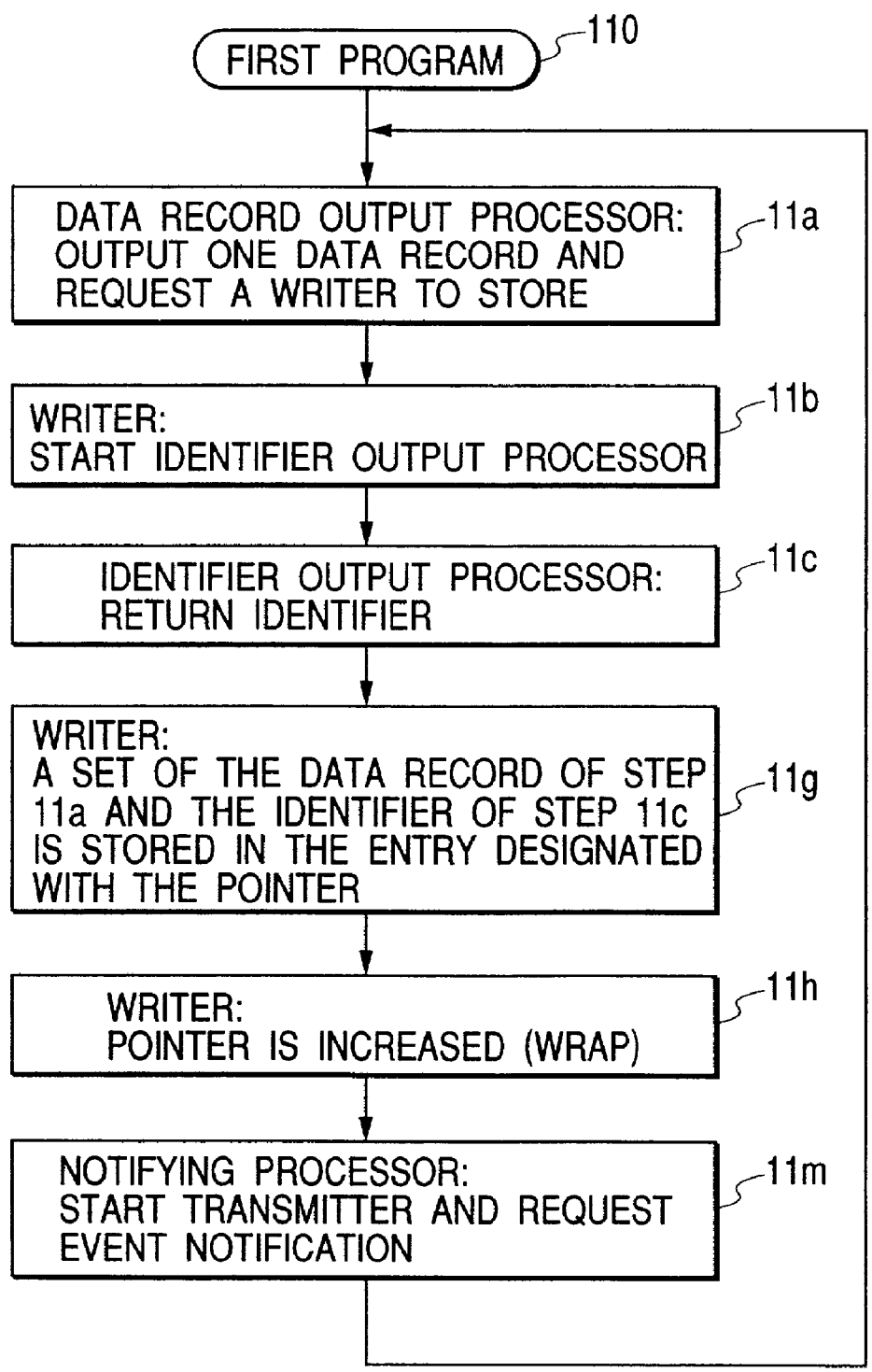
FIG. 26 is a flowchart illustrating the processes of the first program 110.

FIG. 26 illustrates a flowchart indicating the process of the first program 110 in the fifth embodiment of the present invention.

Unlike FIG. 2, FIG. 26 includes the step 11m. In the step 11m, the notifying processor 117 requests notifying process of an event received by the second program to the transmitter 170. In this embodiment, the timer is unnecessary for the second program and data transfer is controlled with triggering in the transmitter side. Namely, the time interval of data transfer depends on the control of the notifying processor 117.

Figure 27:
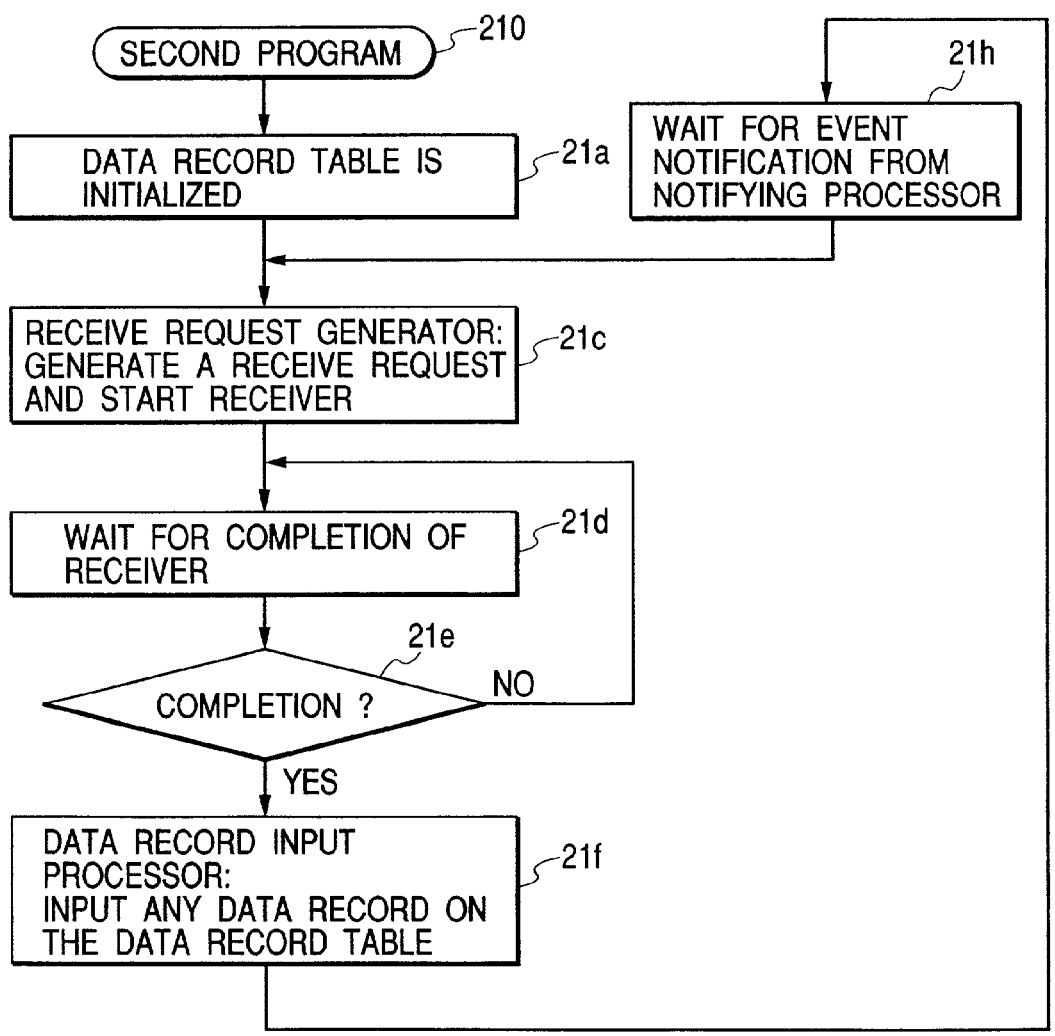
FIG. 27 is a flowchart illustrating the processes of the second program 210.

FIG. 27 is a flowchart indicating the process of the second program 210 in the fifth embodiment of the present invention.

Unlike FIG. 3, FIG. 27 includes the step 21h but does not include the steps 21b and 21g. In the step 21b, the second program 210 waits for notifying process of event from the notifying processor 117. In the fifth embodiment of the present invention, a load in the receiver side is rather small because a large load saving efficiency can be attained for CPU and data transfer is triggered with the notifying process in the transmitter side.

Next, difference between the sixth embodiment and the second embodiment of the present invention will be explained using FIG. 28.

Figure 28:
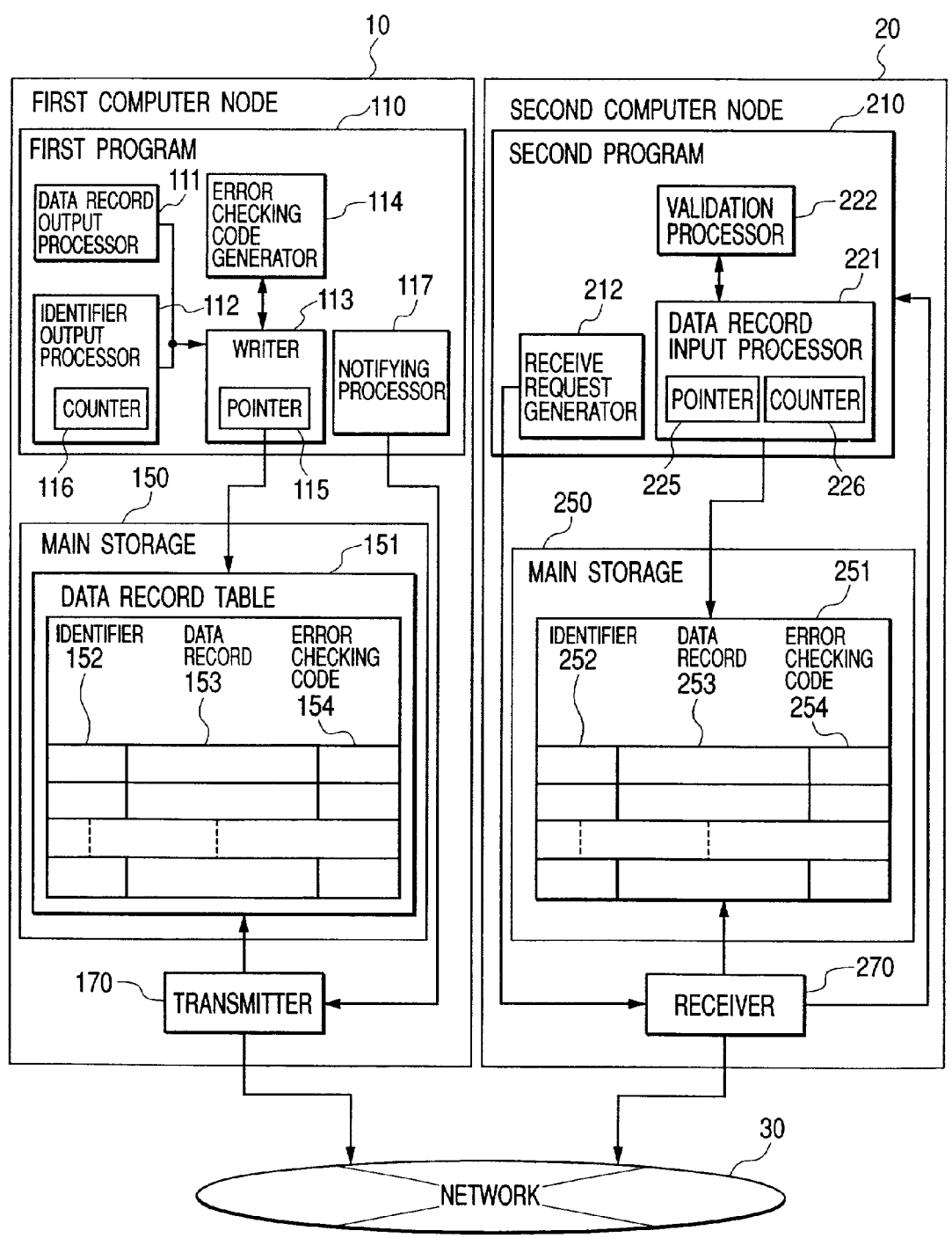
FIG. 28 is a total structural diagram of the sixth embodiment of the present invention.

FIG. 28 is a total structural diagram of the sixth embodiment of the present invention.

FIG. 28 includes, unlike FIG. 13, the notifying processor 117 in the first program but does not include the timer 211 in the second program 210. The other difference between the sixth embodiment and the second embodiment of the present invention is identical to that between the fifth embodiment and the first embodiment of the present invention. Therefore explanation of such difference is neglected here. Namely, it is assumed that the direction to write data record such as the journal data to the data record table 151 is identical to the direction to read such data and the data transfer time interval is controlled in the transmitter side. In the sixth embodiment of the present invention, it can support the data transfer in the same sequence in the read and write processes and provides a large effect in saving the load of CPU. Moreover, a load in the receiver side becomes small because the data transfer is triggered with notifying process in the transmitter side.

Next, difference between the seventh embodiment and third embodiment of the present invention will be explained with reference to FIG. 29.

Figure 29:
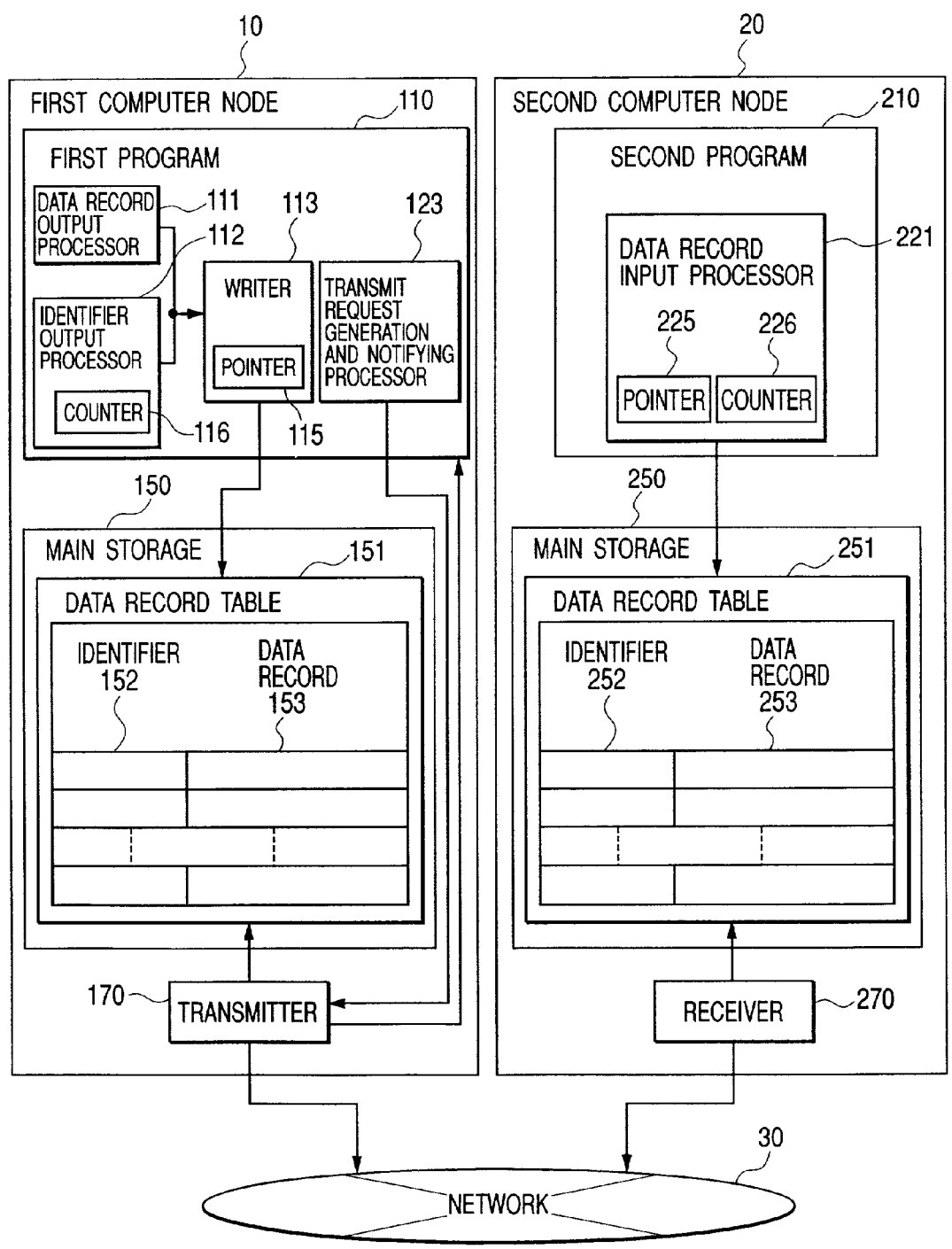
FIG. 29 is a total structural diagram of the seventh embodiment of the present invention.

FIG. 29 is a total structural diagram of the seventh embodiment. Unlike FIG. 19, FIG. 29 includes a data transmit request generator and notifying processor 123 in the first program but does not include the data transmit request generator 122 in the first program 110.

The data transmit request generator and notifying processor 123 transmits, on the occasion of starting the transmitter 117, a set of the data transmit request and notify request to the transmitter, unlike the data transmit request generator 122. However, in order to embody the present invention, it is not always required to form a set of the data transmit request and notify request. In the seventh embodiment of the present invention, a load saving efficiency of CPU can be enlarged and application to data transfer not supporting RDMA-Read is also possible. Moreover, a load in the receiver side is rather small because data transfer is triggered with notifying process in the transmitter side.

Figure 30:
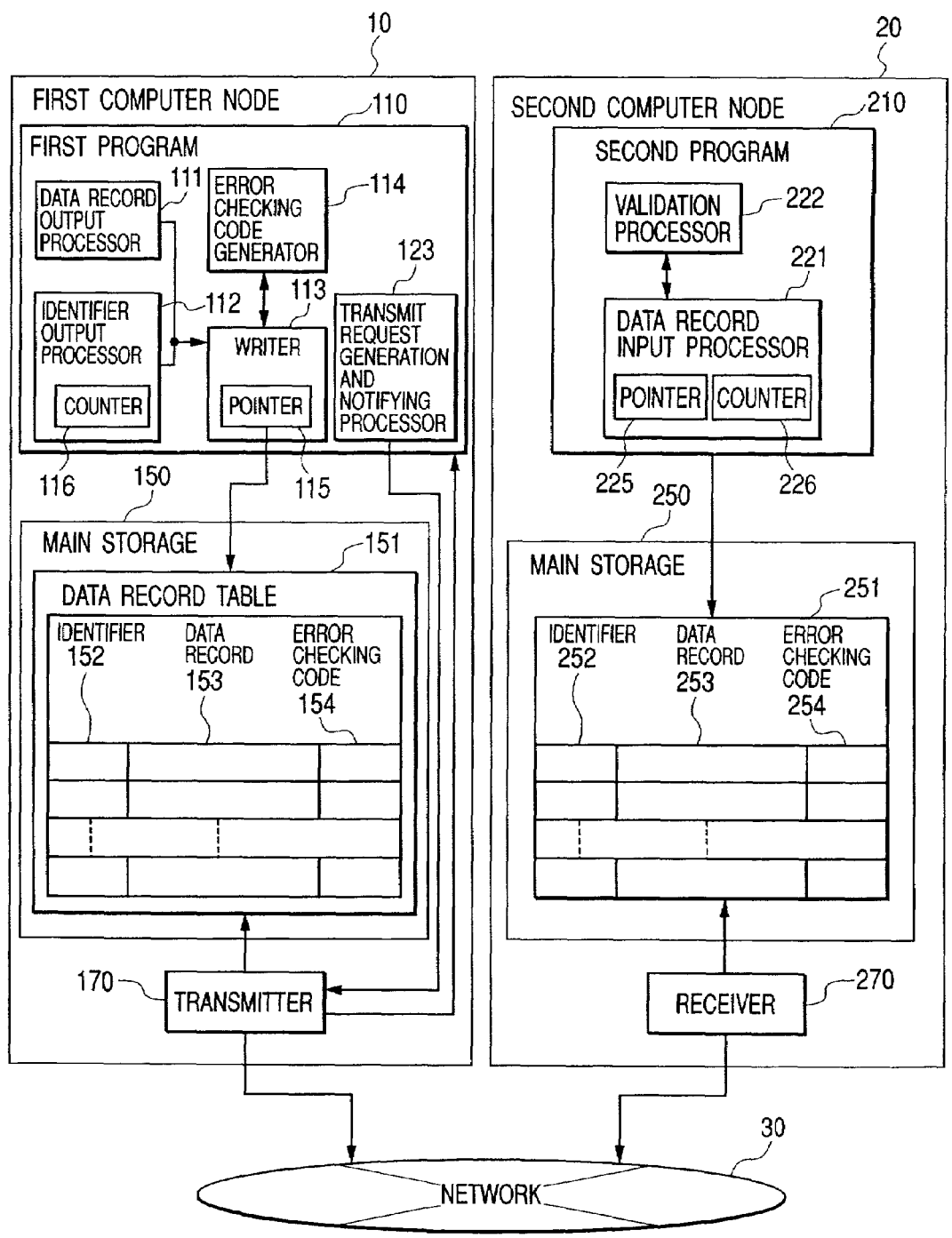
FIG. 30 is a total structural diagram of the eighth embodiment of the present invention.

Next, difference between the fourth embodiment and the eighth embodiment by referring to FIG. 30.

FIG. 30 is a total structural diagram of the eighth embodiment of the present invention. Unlike FIG. 23, FIG. 30 includes the data transmit request generator and notifying processor 123 in the first program but does not include the data transmit request generator 122 in the first program 110. In the eighth embodiment of the present invention, application is possible to the data transfer where the read process is conducted in the same direction as the write process and is also possible to the data transfer not supporting RDMA-Read. Moreover, a load in the receiver side is rather small because data transfer is triggered with notifying process in the transmitter side.

Next, the ninth embodiment of the present invention will be explained with reference to FIG. 31.

Figure 31:
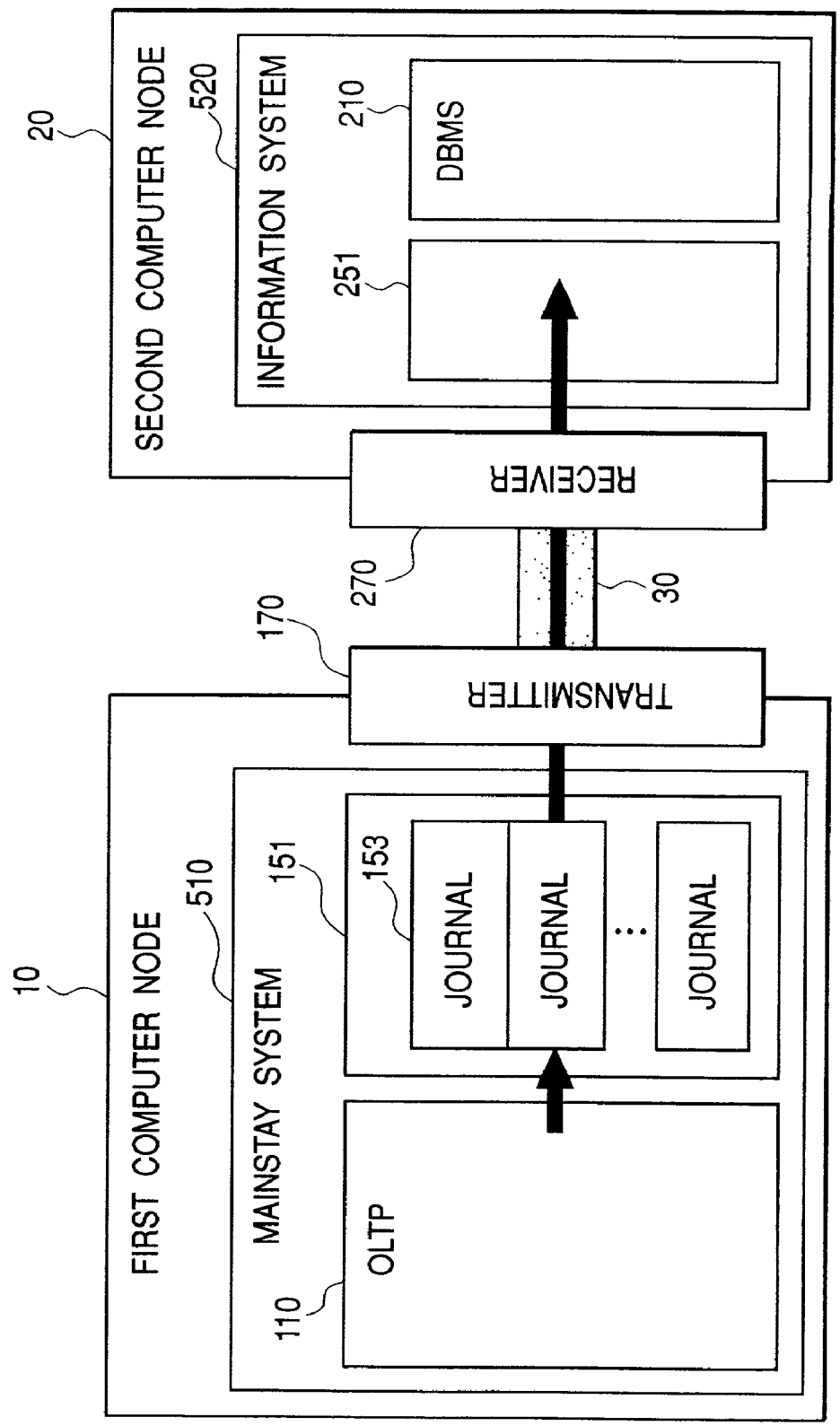
FIG. 31 is a total structural diagram of the ninth embodiment of the present invention.

FIG. 31 is a total structural diagram of the ninth embodiment of the present invention. The first computer node 10 includes a mainstay network system 510, while the second computer node 20 includes the information network system 20. The first program 110 is the online transaction processing (OLTP) in the ninth embodiment of the present invention. In the ninth embodiment of the present invention, the data record 153 is the journal outputted for OLTP 110 to store the processes thereof. The second program 210 is a database management system (DBMS) in the ninth embodiment of the present invention.

The ninth embodiment of the present invention indicates a practical application of the processing content indicated in the embodiments of the present invention from the first to eighth embodiments thereof. With the process identical to any one of these embodiments, the journal 153 outputted from OLTP 110 is transferred to the information system 520.

Next, the tenth embodiment of the present invention will be explained with reference to FIG. 32.

Figure 32:
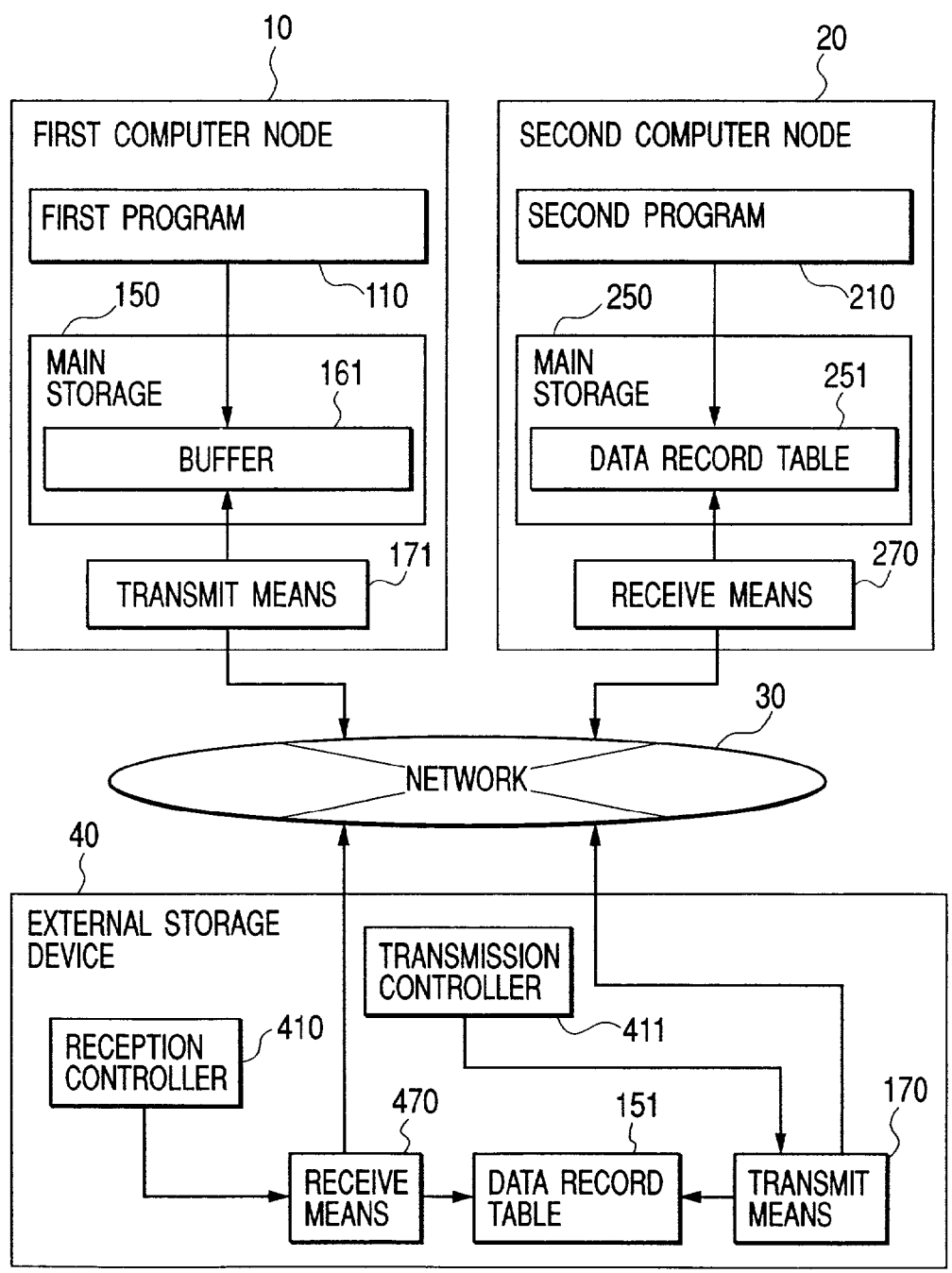
FIG. 32 is a total structural diagram of the tenth embodiment of the present invention.

FIG. 32 is a total structural diagram of the tenth embodiment of the present invention. In the tenth embodiment of the present invention, the first computer node 10, second computer node 20 and external storage device 40 are connected with each other through the network 30. The external storage device 40 comprises a transmit means 170, a receive means 470, a data record table 151, a reception controller 410 and a transmission controller 411. The reception controller 410 controls the receive means 470. The transmission controller 411 controls the transmit means 170. The first computer node comprises the first program 110, main storage 150 and transmit means 171. Moreover, the main storage 150 includes a buffer 161. This buffer 161 tentatively stores the data to be stored in the data record table 151 with the first program 110 for the convenience of reference from the transmit means 171 at the time of data transmission.

The second computer node 20 comprises the second program 210, main storage 250 and receive means 270. The main storage 250 includes the data record table 251.

The tenth embodiment of the present invention is identical to the embodiments from the first to eighth embodiments already explained above, only except for that the first program 110 stores a set of the data record 153 and identifier 152 to the data record table 151 during communication with the reception controller 410 via the buffer 161, transmit means 171 and receive means 470. This storing method is not related in direct with the present invention and therefore explanation thereof is neglected here.

In the tenth embodiment of the present invention, the final data write operation to the data record table 151 is conducted with the receive means 470. The direction to write data to the data record table 151 with the receive means 470 is identical to that of storing of data with the writer 113 in the embodiments from the first to eighth embodiments of the present invention.

The transmission controller 411 executes the process similar to that by the data transmit request generator 122 in the third and fourth embodiments of the present invention, or by the notifying processor 117 in the fifth and sixth embodiments thereof, or by the data transmit request generator and notifying processor 123 in the seventh and eighth embodiment thereof. The transmission controller 411 and reception controller 410 operate asynchronously with each other.

A structure of the tenth embodiment of the present invention is identical to that of the embodiments from the first to eighth embodiments, except for the difference explained above.

In the tenth embodiment of the present invention, the data record 153 outputted by the first program is transferred to the second program through the structure explained above with the processes similar to any one of the process content of the embodiments from the first to eighth embodiment.

With the present invention, synchronous overhead of the data transmission and reception programs can be reduced.

What is claimed is:

1. A computer system including a first computer node and a second computer node connected to said first computer node, comprising:

a first storage area for storing data records;

a first processor provided with said first computer node for storing the data records to said first storage area asynchronously with said second computer node with a free time interval;

a transmitter provided with said first computer node for sending the data records stored in said first storage area;

a second storage area for storing the data records copied from said first storage area;

a receiver provided with said second computer node and connected to said transmitter via a network for requesting said transmitter to send a record group of the data records stored in said first storage area via said network and designated by a request command sent by said receiver, receiving the record group of the data records from said transmitter via said network and storing the record group of the data records to said second storage area; and a second processor for designating the record group of the data records, to be read from said first storage area using address information of said first storage area in a free time interval asynchronously with storing executed by said first processor and for letting said receiver send the request command to said transmitter, wherein said transmitter reads the record group of the data records designated by the request command sent from said receiver and sends the record group of the data records to said receiver in response to the request command via said network, and wherein said first processor stores each record group of the data records into said first storage area with an identifier number indicating a sequence of storing of the each record group of the data records, said transmitter sends the record group of the data records to said receiver in reverse order of the sequence of storing, and said second processor refers to the record group of the data records in said first storage area copied to said second storage area based on the reverse order in order to determine whether the relevant record group of the data records are correct or not depending on said identifier number.

2. A computer system as claimed in claim 1, wherein said first storage area is allocated within said first computer node.

3. A computer system as claimed in claim 1, wherein said second storage area is allocated within said second computer node.

4. A computer system as claimed in claim 1, wherein said first storage area is allocated within an external storage device connecting with said first computer node and said second computer node.

5. A computer system as claimed in claim 1, wherein said second computer node is provided with a timer for starting said second processor with a constant time interval to indicate said receiver to send the request command to said transmitter via said network.

6. A computer system as claimed in claim 1, wherein said first processor writes the identifier number of the relevant record group of the data records after having written the data records and said second processor determines that the relevant record group of the data records are correct when the identifier number of the relevant record group of the data records read to said second storage area has continuity.

7. A computer system as claimed in claim 1, wherein said first processor further includes an error checking code generator for generating an error checking code for the record group of the data records to write the record group of the data records and the error checking code to said first storage area and said second processor checks an error, by use of the error checking code, of the record group of the data records read to said second storage area.

8. A computer system as claimed in claim 7, wherein said first storage area includes a plurality of entries for storing a set of said error checking code and the data records to read the data records in the inverse direction to the direction to write the data records to said entry with said first processor.

9. A computer system comprising:
- a first computer node including a first processor, a first memory coupled to said first processor, and a transmitter coupled to said first processor and said first memory;
- a second computer node including a second processor, a second memory coupled to said second processor, and a receiver coupled to said second processor and said second memory;
- a network being coupled to said transmitter and said receiver,
- wherein said first processor stores a plurality of data records into said first memory based on a first timing;
- wherein said second processor indicates said receiver to send a read request, which includes information indicating a part of the plurality of data records stored in said first memory, to said transmitter via said network based on a second timing which is independent of the first timing of storing the plurality of data records into said first memory, and said second processor makes the information indicating a part of the plurality of the data records by using address information of said first memory,
- wherein said receiver sends the read request to said transmitter via said network in response to the indication of said second processor and said transmitter reads the part of the plurality of data records from said first memory and sends the part of the plurality of data records to said receiver via said network in response to the read request,
- wherein said receiver stores the part of the plurality of data records received from said transmitter into said second memory,
- wherein said first processor stores the plurality of data records with a sequence number, wherein said second processor makes the information indicating the part of the plurality of data records stored in said first memory based on the sequence number, wherein said transmitter sends the part of the plurality of data records in reverse order of the sequence number, and wherein said receiver stores the part of the plurality of data records into said second memory in reverse order of the sequence number.

10. A computer system as claimed in claim 9, wherein said second computer node includes a timer and the second timing is created by said second processor based on said timer.

* * * * *